(12) United States Patent
Ohashi et al.

(10) Patent No.: US 8,420,983 B2
(45) Date of Patent: Apr. 16, 2013

(54) VAPOR COOKER

(75) Inventors: Noriko Ohashi, Osaka (JP); Yuko Nakajima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 508 days.

(21) Appl. No.: 12/672,200

(22) PCT Filed: Jul. 16, 2008

(86) PCT No.: PCT/JP2008/062798
§ 371 (c)(1),
(2), (4) Date: Feb. 4, 2010

(87) PCT Pub. No.: WO2009/019959
PCT Pub. Date: Feb. 12, 2009

(65) Prior Publication Data
US 2010/0230397 A1    Sep. 16, 2010

(30) Foreign Application Priority Data

Aug. 8, 2007  (JP) ................................. 2007-206159
Aug. 8, 2007  (JP) ................................. 2007-206161

(51) Int. Cl.
  *F27D 11/00*  (2006.01)
(52) U.S. Cl.
  USPC .......................................... 219/401; 219/398
(58) Field of Classification Search .................. 219/401, 219/395, 396, 398
  See application file for complete search history.

(56) References Cited

U.S. PATENT DOCUMENTS

2006/0191892 A1   8/2006  Andoh et al.
2007/0138160 A1   6/2007  Ando et al.
2010/0126358 A1   5/2010  Ueda et al.

FOREIGN PATENT DOCUMENTS

| EP | 1 662 205 A1 | 5/2006 |
| EP | 1 729 065 A1 | 12/2006 |
| JP | 6-42750 A | 2/1994 |
| JP | 7-293889 A | 11/1995 |
| JP | 2000-215977 A | 8/2000 |
| JP | 2005-61816 A | 3/2005 |
| JP | 2005-69521 A | 3/2005 |
| JP | 2005-265308 A | 9/2005 |
| JP | 2005-265341 A | 9/2005 |
| JP | 2006-38255 A | 2/2006 |
| SU | 1099948 A | 6/1984 |
| WO | WO 2007/013408 A1 | 2/2007 |

*Primary Examiner* — Charles Garber
*Assistant Examiner* — Reema Patel
(74) *Attorney, Agent, or Firm* — Birch, Stewart, Kolasch & Birch, LLP

(57) ABSTRACT

A steam cooker 1 has: a steam generation heater 52 generating steam; and a steam heating heater 41 heating the steam generated by the steam generation heater 52 to generate overheated steam and heating steam in a heating chamber 20 through circulation, an-article-to-be-heated F being cooked by use of steam fed into the heating chamber 20. The steam cooker 1 has: a first cooking step in which the article-to-be-heated F is cooked with supply of electric power to the steam generation heater 52 being larger than that to the steam heating heater 41; and a second cooking step in which the article-to-be-heated F is cooked with supply of electric power to the steam generation heater 52 being smaller than that to the steam heating heater 41. When the temperature of the article-to-be-heated F exceeds the fat melting temperature zone but is less than or equal to 100° C., the first cooking step is switched to the second cooking step.

16 Claims, 11 Drawing Sheets

VAPOR COOKER

TECHNICAL FIELD

The present invention relates to a steam cooker that cooks an article-to-be-heated by jetting out steam into a heating chamber.

BACKGROUND ART

A conventional steam cooker is disclosed in Patent Document 1. This steam cooker uses overheated steam as a heating medium, and has an article-to-be-heated placed on a tray arranged in a heating chamber. At a side of the heating chamber, a water tank is arranged, from which water is fed via a water feed passage to a steam generation device. The steam generation device has a steam generating heater, by which water is heated to generate steam.

The steam is blown out to a steam heating device that has a steam heating heater. The steam heating device heats the steam further by the steam heating heater to generate overheated steam, and then jets out the overheated steam to the heating chamber. The overheated steam jetted out to the heating chamber circulates to be heated by the steam heating heater, so that the overheated steam is maintained at a high temperature.

In this way, the article-to-be-heated is cooked under low-oxygen condition. As a result, it is possible to prevent oxidation of the article-to-be-heated, and to prevent generation of smell or deterioration in taste due to oxidized fat so as to perform satisfactory cooking. Moreover, fat contained in the article-to-be-heated melts and drips down along with water that has condensed from the steam, so that the article-to-be-heated is subjected to defatting, and thus healthy cooking can be performed.

In steam cookers for house hold use, there is a limitation on electric power that can be used, and electric power is supplied separately to the steam generation heater and to the steam heating heater. Overheated steam generated by the steam generation heater and the steam heating heater has a large latent heat, and condenses on the surface of the article-to-be-heated to permit its internal temperature to be raised quickly. In addition, by heat (radiation heat or hot airstream) from the steam heating heater, the article-to-be-heated is heated from its surface, so that, in addition to the internal temperature being raised, the surface of the article-to-be-heated is roasted brown.

For this reason, in a case where the supply of electric power to the steam generation heater is small, when the inside of the article-to-be-heated reaches an adequate temperature, the surface becomes scorched. On the other hand, in a case where the supply of electric power to the steam generation heater is large, when the inside of the article-to-be-heated reaches an adequate temperature, the surface is not roasted brown. Thus, the surface is not done crisp, and the taste is lost. Accordingly, cooking is performed with an appropriate electric power supplied to the steam generation heater and to the steam heating heater (for example, 260 W and 1040 W, respectively).
Patent Document 1: JP-A-2005-61816

DISCLOSURE OF THE INVENTION

Problems to be Solved by the Invention

Due to consumers being increasingly conscientious of health these days, the needs of cookers that offer high defatting effect have been increasingly high. According to the conventional steam cooker described above, it has been necessary to raise cooking temperature or lengthen cooking time to improve defatting effect. However, since there is a limitation on electric power that can be used with cookers for house hold use, it is difficult to raise the cooking temperature, but then lengthy cooking time reduces user convenience, which is a problem.

Moreover, according to the conventional steam cooker described above, the internal temperature of an article-to-be-heated is raised by the latent heat of overheated steam and the heat from the steam heating heater. Specifically, the heat from the steam heating heater, whose heating efficiency with respect to the internal temperature of the article-to-be-heated is lower than the overheated steam, is used for raising the internal temperature of the article-to-be-heated. Thus, when the volume of the article-to-be-heated is large, the internal temperature takes time to reach a desired temperature, and the cooking time is disadvantageously lengthened.

An object of the present invention is to provide a steam cooker that can improve defatting effect. Another object of the invention is to provide a steam cooker that can shorten cooking time of an article-to-be-heated.

Means for Solving the Problem

To achieve the above object, according to the invention, a steam cooker comprises: a steam generation heater generating steam; and a steam heating heater heating the steam generated by the steam generation heater to generate overheated steam and heating steam in a heating chamber through circulation, an article-to-be-heated being cooked by use of the steam fed into the heating chamber, wherein the steam cooker comprises: a first cooking step in which the article-to-be-heated is cooked with supply of electric power to the steam generation heater being larger than supply of electric power to the steam heating heater; and a second cooking step in which the article-to-be-heated is cooked with supply of electric power to the steam generation heater being smaller than supply of electric power to the steam heating heater, and the first cooking step is switched to the second cooking step when an internal temperature of the article-to-be-heated exceeds a fat melting temperature zone but is less than or equal to 100° C.

With this design, during operation of the steam generation heater and the steam heating heater, water is fed from a water feed tank or the like to the steam generation heater, so that steam is generated. The steam so generated is further heated by the steam heating heater, and thus overheated steam with a temperature higher than 100° C. is generated. The overheated steam is fed to the heating chamber, and circulates to be heated by the steam heating heater. In this way, cooking by high-temperature overheated steam is performed.

When a predetermined cooking menu starts, the first cooking step is performed in which the supply of electric power to the steam generation heater is larger than that to the steam heating heater. Thus, a large amount of overheated steam is fed to the heating chamber to perform cooking. Note that when the steam heating heater is stopped, cooking is performed with a large amount of saturated steam fed to the heating chamber. By latent heat of the large amount of steam, the article-to-be-heated has its internal temperature rapidly raised.

When the article-to-be-heated is heated by steam, the internal temperature rises rapidly, and then, within a range of 100° C. or less, a rise in the internal temperature becomes gradual. Thereafter, when the moisture inside the article-to-be-heated esteamates, the internal temperature exceeds 100° C. and further rises rapidly. In the first cooking step, when the internal temperature of the article-to-be-heated exceeds a fat melting temperature zone of about 30 to 60° C. within a range of 100° C. or less, fat starts to ooze out, and then switching to the second cooking step is performed.

In the second cooking step, electric power supplied to the steam generation heater is set smaller than that supplied to the steam heating heater. This allows the article-to-be-heated to be cooked by overheated steam or saturated steam that is heated by the steam heating heater through circulation. As a result, the article-to-be-heated is heated mainly at its surface, has its internal temperature maintained at a desirable temperature, and has its surface roasted brown, completing the cooking.

Moreover, according to the invention, in the steam cooker designed as described above, a cooking menu corresponding to the type of the article-to-be-heated; and a cooking sequence data according to the cooking menu are stored, and, in the cooking sequence data, data of a time at which the first cooking step is switched to the second cooking step based on the fat melting temperature characteristic depending on the type of the article-to-be-heated is included.

With this design, when the cooking menu is selected, cooking sequence data corresponding to the selected cooking menu is called up. The cooking sequence data includes data of the time at which the first and the second cooking steps are switched based on the fat melting temperature characteristic that varies with different article-to-be-heated. When the first cooking step starts, switching time that varies with different article-to-be-heated is acquired from the cooking sequence data. Then, when the cooking time of the first cooking step reaches the acquired time, switching to the second cooking step is performed.

Moreover, according to the invention, the steam cooker designed as described above comprises input portion of the volume of the article-to-be-heated via which the volume of the article-to-be-heated is inputted, and, based on input information of input portion of the volume of the article-to-be-heated, the time is varied at which the first cooking step is switched to the second cooking step.

With this design, the cooking menu is selected, then the volume of the article-to-be-heated is inputted by input portion of the volume of the article-to-be-heated, and then cooking is started. When the first cooking step starts, the switching time that varies with different article-to-be-heated is acquired from the cooking sequence data. The switching time of the first and the second cooking steps is varied so as to be delayed when the volume of the article-to-be-heated is large, and to be put forward when the volume of the article-to-be-heated is small. Then, when the cooking time of the first cooking step reaches the varied time, switching to the second cooking step is performed.

Moreover, according to the invention, in the steam cooker designed as described above, the first cooking step is switched to the second cooking step when the internal temperature of the article-to-be-heated is 60 to 80° C.

Moreover, according to the invention, in the steam cooker designed as described above, the first cooking step is switched to the second cooking step at the time at which the rate of temperature variation in the internal temperature of the article-to-be-heated becomes small from a substantially constant state. With this design, the internal temperature of the article-to-be-heated is raised rapidly by feeding of steam, and the first cooking step is switched to the second cooking step at the time a rise in the internal temperature becomes gradual.

Moreover, according to the invention, a steam cooker comprises: a steam generation heater generating steam; and a steam heating heater heating the steam generated by the steam generation heater to generate overheated steam and heating steam in a heating chamber through circulation, an article-to-be-heated being cooked by use of the steam fed into the heating chamber, wherein the steam cooker comprises: a first cooking step in which the article-to-be-heated is cooked with supply of electric power to the steam generation heater being larger than supply of electric power to the steam heating heater; and a second cooking step in which the article-to-be-heated is cooked with supply of electric power to the steam generation heater being smaller than supply of electric power to the steam heating heater, and the first cooking step is switched to the second cooking step at the time at which the rate of temperature variation in the internal temperature of the article-to-be-heated becomes small from a substantially constant state.

With this design, when a predetermined cooking menu starts, the first cooking step is performed in which the supply of electric power to the steam generation heater is larger than that to the steam heating heater. In this way, cooking is performed with a large amount of overheated steam fed to the heating chamber. Note that when the steam heating heater is stopped, cooking is performed with a large amount of saturated steam fed to the heating chamber.

The internal temperature of the article-to-be-heated is raised rapidly by feeding of steam and, at the time a rise in the internal temperature becomes gradual, the first cooking step is switched to the second cooking step. In the second cooking step, the electric power supplied to the steam generation heater is set to be smaller than that supplied to the steam heating heater. In this way, by overheated steam or saturated steam heated by the steam heating heater through circulation, the article-to-be-heated is cooked.

Moreover, according to the invention, in the steam cooker designed as described above, the steam heating heater is stopped in the first cooking step.

Moreover, according to the invention, in the steam cooker designed as described above, the steam generation heater is stopped in the second cooking step.

Moreover, according to the invention, in the steam cooker designed as described above, the article-to-be-heated is heated by radiation heat from the steam heating heater. With this design, the steam heating heater is disposed, for example, at the ceiling surface of the heating chamber and, by the radiation heat from the steam heating heater radiating the article-to-be-heated, heat-cooking is performed.

Moreover, according to the invention, in the steam cooker designed as described above, between the first and the second cooking steps, an intermediate cooking step is provided in which the supply of electric power to the steam generation heater is smaller than in the first cooking step but is larger than in the second cooking step, and in which supply of electric power to the steam heating heater is larger than in the first cooking step but smaller than in the second step.

Moreover, according to the invention, in the steam cooker designed as described above, the supply of electric power to the steam generation heater and to the steam heating heater is distributed according to the duty ratio; in the first cooking step, the duty ratio of the supply of electric power to the steam generation heater is made larger than the duty ratio of the supply of electric power to the steam heating heater, and, in the second cooking step, the duty ratio of the supply of electric power to the steam generation heater is made smaller than the duty ratio of the supply of electric power to the steam heating heater.

With this design, electric power is distributed to the steam generation heater and to the steam heating heater from the power source with the duty ratio being varied. In the first cooking step, the duty ratio of the supply of electric power to the steam generation heater is larger than the duty ratio of the supply of electric power to the steam heating heater, and thus a large amount of overheated steam is fed to the heating chamber. With the duty ratio of the supply of electric power to the steam generation heater made smaller than the duty ratio of the supply of electric power to the steam heating heater, switching to the second cooking step is performed.

Moreover, according to the invention, in the steam cooker designed as described above, the duty ratio of the supply of electric power to the steam generation heater is decreased stepwise, and the duty ratio of the supply of electric power to the steam heating heater is increased stepwise.

Moreover, according to the invention, a steam cooker comprises: a steam generation heater generating steam; and a steam heating heater heating the steam generated by the steam generation heater to generate overheated steam and heating steam in a heating chamber through circulation, an article-to-be-heated being cooked by use of the steam fed into the heating chamber, wherein supply of electric power to the steam generation heater and to the steam heating heater is distributed according to a duty ratio, a duty ratio of the supply of electric power to the steam generation heater is made larger than a duty ratio of the supply of electric power to the steam heating heater in an early stages of cooking, the duty ratio of the supply of electric power to the steam generation heater is decreased stepwise and the duty ratio of the supply of electric power to the steam heating heater is increased stepwise, and the duty ratio of the supply of electric power to the steam generation heater is made smaller than the duty ratio of the supply of electric power to the steam heating heater at a predetermined time.

With this design, electric power is distributed to the steam generation heater and to the steam heating heater from the power source with the duty ratio being varied. Water is fed to the steam generation heater from a water feed tank or the like, so that steam is generated. The steam so generated is heated further by the steam heating heater, and overheated steam with a temperature higher than 100° C. is generated. Here, the duty ratio of the supply of electric power to the steam generation heater is larger than the duty ratio of the supply of electric power to the steam heating heater, and thus a large amount of overheated steam is fed to the heating chamber. The overheated steam fed to the heating chamber circulates to be heated by the steam heating heater. The article-to-be-heated has its internal temperature raised rapidly by latent heat of the large amount of overheated steam.

When cooking is performed for a predetermined time, the duty ratio of the supply of electric power to the steam generation heater is decreased stepwise and the duty ratio of the supply of electric power to the steam heating heater is increased stepwise. Here, the internal temperature of the article-to-be-heated is raised by heat from overheated steam and the steam heating heater, and the surface of the article-to-be-heated is heated by the heat from the steam heating heater. Then, when the duty ratio of the supply of electric power to the steam generation heater becomes smaller than the duty ratio of the supply of electric power to the steam heating heater, by overheated steam or saturated steam that is heated by the steam heating heater through circulation, the article-to-be-heated is cooked. In this way, the article-to-be-heated is heated mainly at its surface, has its internal temperature maintained at a desirable temperature, and has its surface roasted brown, completing the cooking.

Advantages of the Invention

According to the present invention, since the first cooking step is comprised in which the supply of electric power to the steam generation heater is larger than the supply of electric power to the steam heating heater, by latent heat of a large amount of steam, the internal temperature of the article-to-be-heated such as meat can be raised rapidly. In this way, the internal temperature of the article-to-be-heated can be made higher than the fat melting temperature zone in an early stages.

Moreover, after the internal temperature of the article-to-be-heated exceeds the fat melting temperature zone and fat starts to ooze out, switching to the second cooking step is performed in which the supply of electric power to the steam generation heater is made smaller than that to the steam heating heater, and thus it is possible to complete cooking with the internal temperature of the article-to-be-heated maintained at a desirable temperature and with the surface thereof roasted brown.

It is therefore possible to secure a proper amount of moisture inside the article-to-be-heated so as to maintain taste, and to lengthen the period in which the temperature is higher than the fat melting temperature zone without lengthening cooking time. In this way, without lowering the usability of the steam cooker, the amount of defatting of the article-to-be-heated can be increased and thus healthy cooking can be performed. Moreover, since the internal temperature of the article-to-be-heated becomes high in an early stages, cooking time can be reduced. When the amount of defatting of the article-to-be-heated is to be similar to a conventional amount, cooking time can be reduced further.

Moreover, according to the invention, since the duty ratio of the supply of electric power to the steam generation heater is larger than that to the steam heating heater in an early stages of cooking, less heat from the steam heating heater is used for raising the internal temperature of the article-to-be-heated, and thus, by latent heat of a large amount of overheated steam with high heating efficiency, the internal temperature of the article-to-be-heated can be raised rapidly. Moreover, since the duty ratio of the supply of electric power to the steam generation heater is made smaller than that to the steam heating heater at a predetermined time, it is possible to complete cooking with the internal temperature of the article-to-be-heated maintained at a desirable temperature and with the surface thereof roasted brown.

Furthermore, since the duty ratio of the supply of electric power to the steam generation heater and to the steam heating heater is varied stepwise, it is possible to prevent reduction in the amount of moisture in a circumferential part of the article-to-be-heated, and to obtain a longer period for roasting the surface brown. Accordingly, it is possible to shorten the cooking time even when the volume of the article-to-be-heated is large, and to secure a proper amount of moisture inside it so as to maintain the taste.

| List of Reference Symbols | |
|---|---|
| 1 | steam cooker |
| 11 | door |
| 20, 120 | heating chamber |
| 21 | tray |
| 26, 126 | blower fan |
| 28 | suction port |
| 31 | exhaust fan |
| 32, 33, 132, 133 | exhaust duct |
| 34 | steam feed duct |
| 35, 135 | circulation duct |
| 40, 140 | steam heating device |
| 41, 141 | steam heating heater |
| 48 | damper |
| 50 | steam generation device |
| 51 | pot |
| 52 | steam generation heater |
| 54 | drain valve |
| 55 | water feed passage |
| 56 | tank-water-level detection portion |
| 57 | water feed pump |
| 61 | jet-out cover |
| 65, 66 | jet port |
| 68 | reflective portion |
| 71 | water tank |
| 71a | drained-water collection portion |
| 81 | pot-water-level detection portion |
| 91 | tank-water-level detection container |
| 101 | heating heater |
| 110 | drain portion |
| 111, 113 | pipe |
| 111a | drain hole |
| 112 | tube |
| 114 | drain tray |
| 115 | tube pump |
| 116 | housing |
| 117 | rotated plate |
| 118 | roller |
| 171 | induction heating coil |
| 172 | IH circuit |
| 200 | esteamation cup |
| 230 | heating member |
| F | article-to-be-heated |
| L | fat |
| S | steam |
| W | condensed water |

BEST MODE FOR CARRYING OUT THE INVENTION

Figure 1:
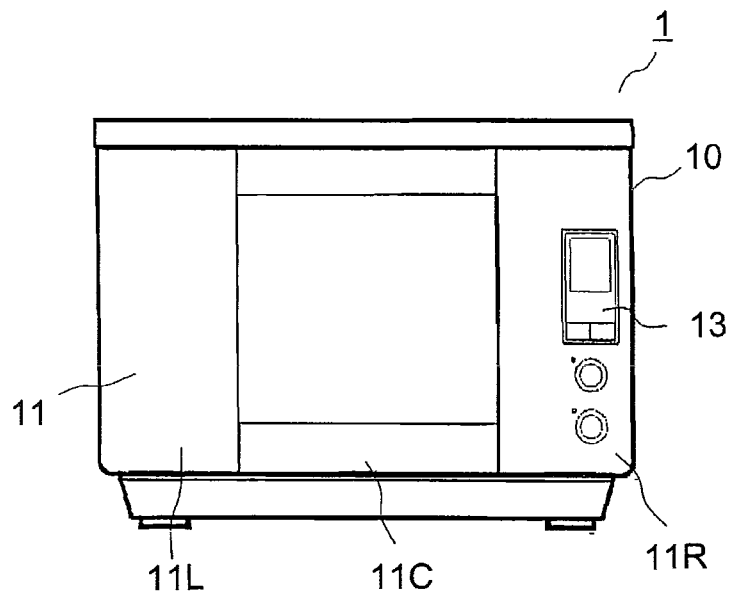
[FIG. 1] A front view showing a steam cooker according to a first embodiment of the present invention.
Figure 2:
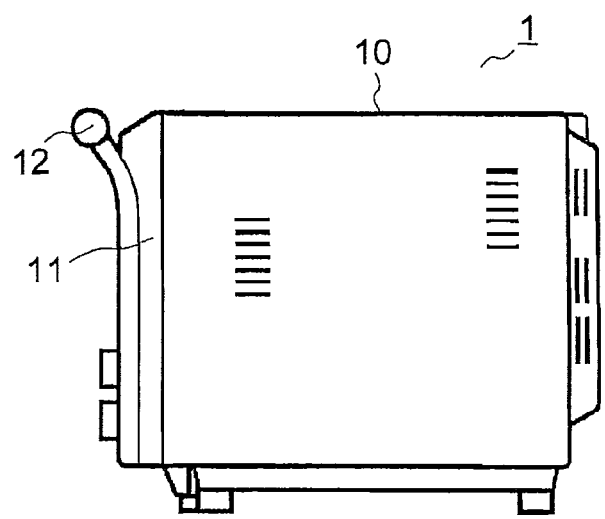
[FIG. 2] A side view showing the steam cooker according to the first embodiment of the invention.

Embodiments of the present invention will be described below with reference to the relevant drawings. FIGS. 1 and 2 are a front view and a side view, respectively, showing a steam cooker according to an embodiment. The steam cooker 1 cooks an article-to-be-heated by overheated steam. The steam cooker 1 is provided with a cabinet 10 in the shape of a rectangular parallelepiped. At the front of the cabinet 10, a door 11 is provided.

The door 11 is pivotally supported so as to be rotatable about its bottom edge in a vertical plane, and a handle 12 is provided at an upper part of the door 11 for opening/closing it. In a middle part 11C of the door 11, a see-through portion 11a (see FIG. 3) is provided in which a heat-resistant glass is set therein that allows the inside to be viewable. On the left and right of the middle part 11C, a left-side part 11L and a right-side part 11R, each having a metal decoration plate at its front, are arranged symmetrically. On the right part 11R of the door 11, an operation panel 13 is provided.

Figure 3:
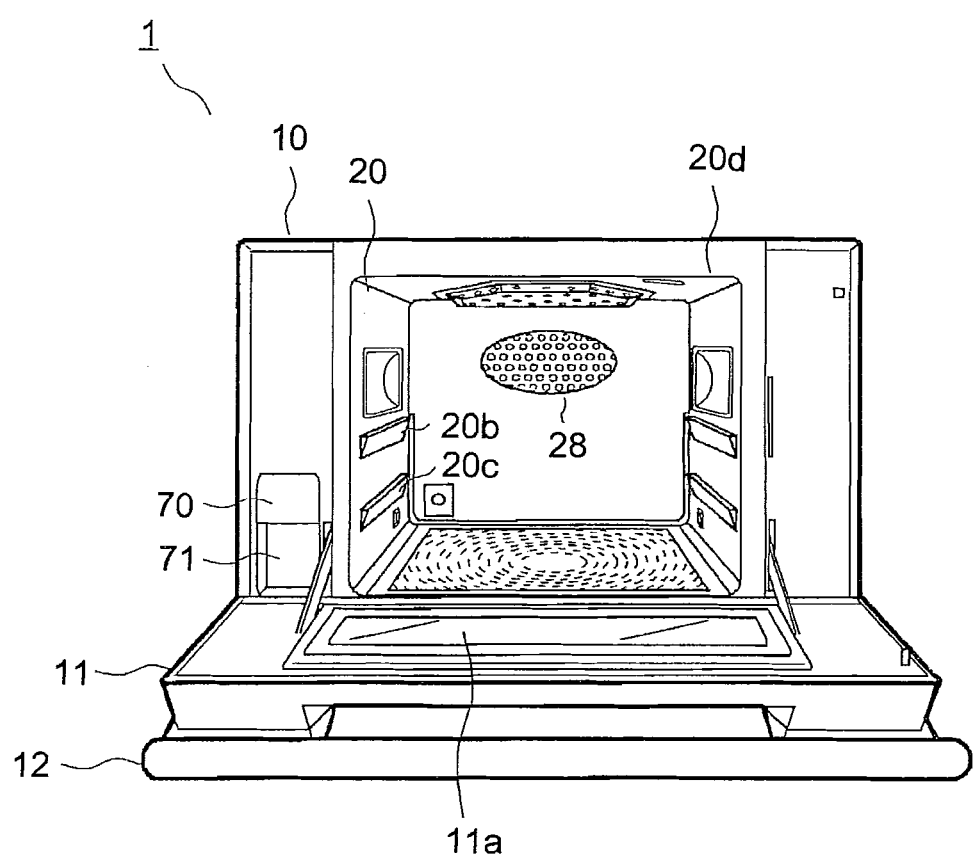
[FIG. 3] A front view showing the steam cooker according to the first embodiment of the invention in a state where a door is opened.

FIG. 3 shows a front view of the steam cooker 1 in a state where the door 11 is opened. When the handle 12 is held and pulled frontward, the door 11 rotates and changes its position through 90 degrees from a vertical, closed state to a horizontal, opened state. When the door 11 is opened, the front face of the cabinet 10 appears.

In the part of the cabinet 10 corresponding to the middle part 11C of the door 11, a heating chamber 20 is provided. In the part of the cabinet 10 corresponding to the left-side part 11L of the door 11, a water tank chamber 70 is provided to accommodate a water tank 71 for collecting water for steam generation. In the part of the cabinet 10 corresponding to the right-side part 11R of the door 11, a control circuit board (unillustrated) is arranged inside, with no opening provided in front it.

Figure 5:
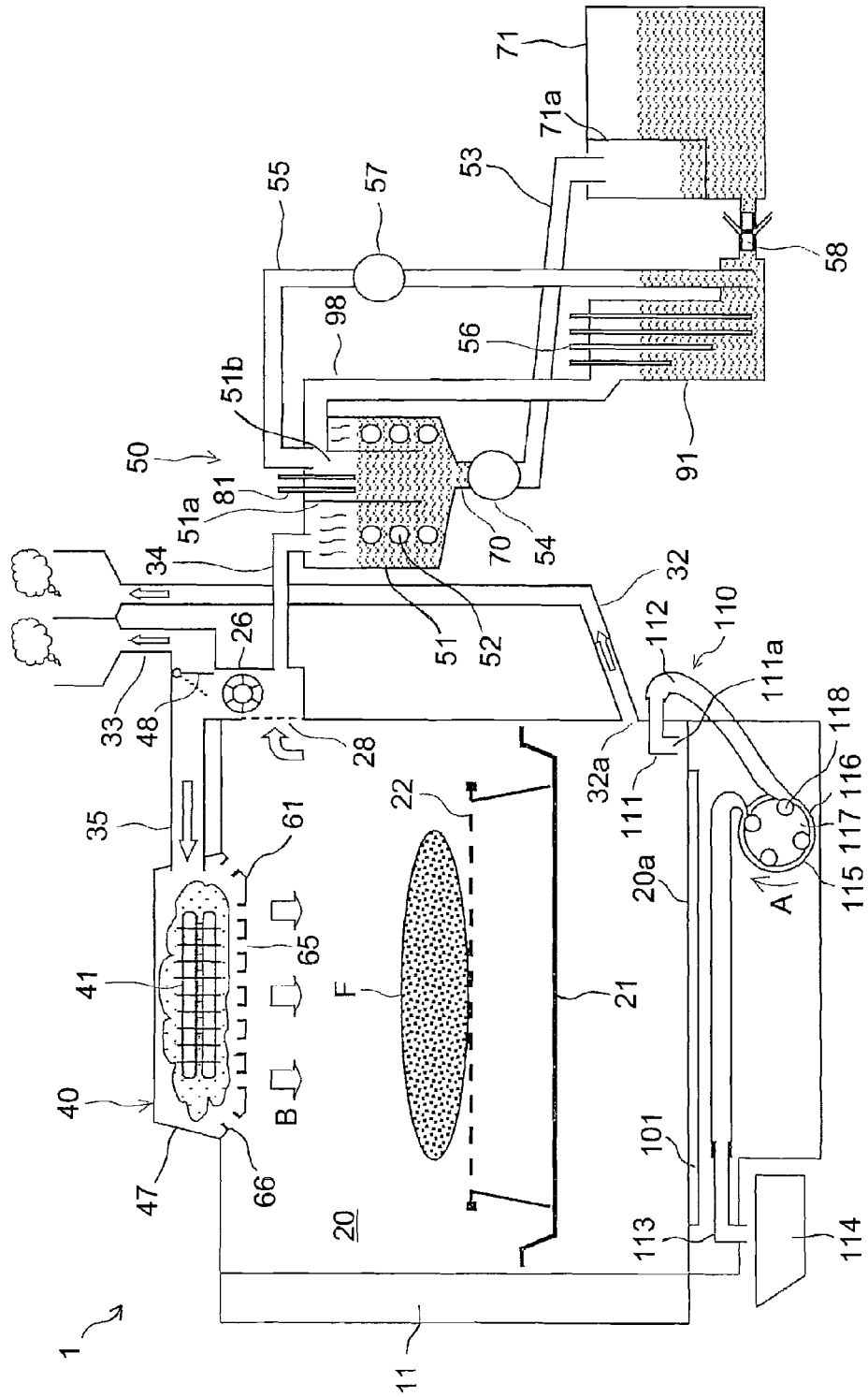
[FIG. 5] A diagram showing an internal structure of the steam cooker according to the first embodiment of the invention.

The heating chamber 20 is formed in the shape of a rectangular parallelepiped, and the entire face on the front side facing the door 11 is formed to be an opening 20d for taking out/putting in the article-to-be-heated F (see FIG. 5). By the door 11 being rotated, the opening 20d is opened/closed. Wall surfaces of the heating chamber 20 are formed out of stainless steel plates, and on an outer circumferential surface of the heating chamber 20, heat insulation is applied.

Figure 4:
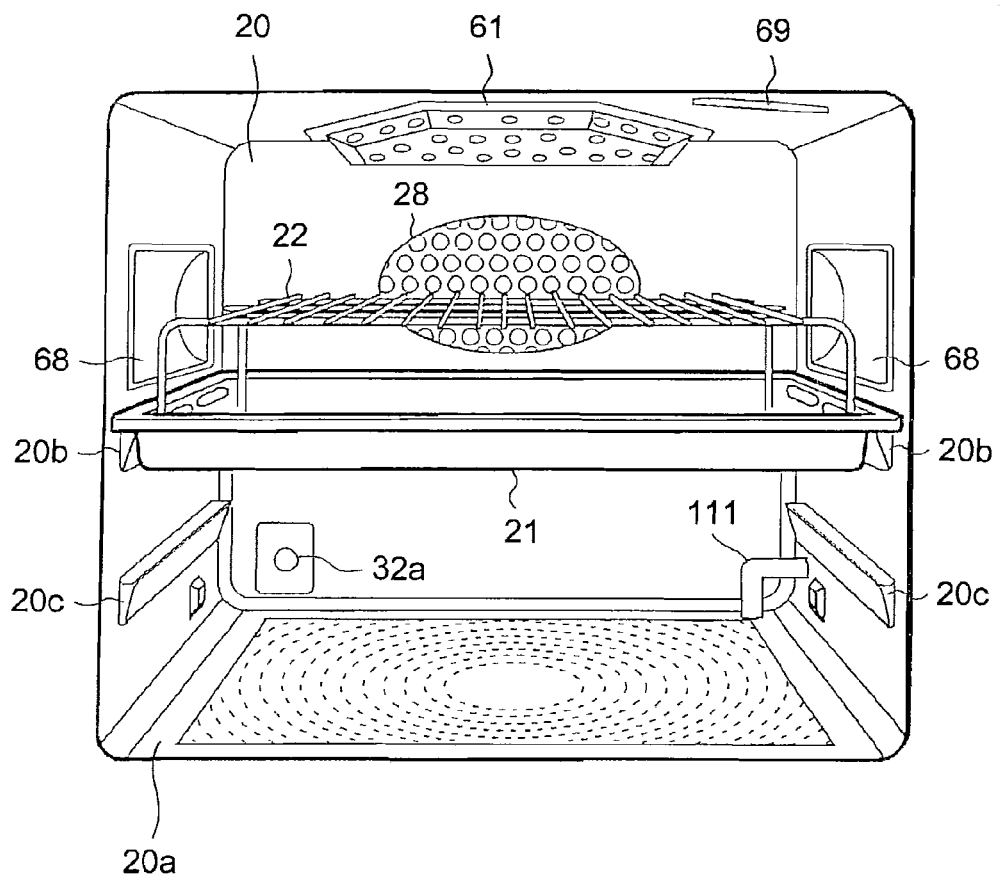
[FIG. 4] A front view showing a heating chamber of the steam cooker according to the first embodiment of the invention.

FIG. 4 is a front view showing the details inside the heating chamber 20. On side walls of the heating chamber 20, a plurality of tray support portions 20b and 20c are provided at different levels. The tray support portion 20b at the upper level is provided lower than a reflective portion 68. By one or both of the tray support portions 20b and 20c, a tray 21 formed out of a stainless steel plate is stopped. On the tray 21, there is placed a stainless-steel-wire rack 22 for putting on the article-to-be-heated F (see FIG. 5).

When cooking is performed by overheated steam, the tray 21 is placed on the tray support portion 20b at the upper level. Thereby, overheated steam can be led to the bottom surface of the article-to-be-heated F by being reflected by the reflective portion 68 as described below. The tray 21 can be placed on the tray support portions 20b and 20c at the upper and lower levels. This makes it possible to cook a large number of articles-to-be-heated F at one time.

Here, the tray 21 that is arranged on the tray support portion 20b is so formed as to allow air to pass through it, so that overheated steam is fed to the top surface of the article-to-be-heated on the tray 21 at the lower level. In addition, the article-to-be-heated on the tray 21 at the lower level has its bottom surface heated by a heating heater 101 (see FIG. 5), which is arranged at the bottom surface of the heating chamber 20.

In a rear wall at the further side of the heating chamber 20, at substantially the middle in the left/right direction, a suction port 28 is provided and, to the bottom left thereof, an exhaust port 32a is provided. The reflective portion 68 is concavely provided in both side walls of the heating chamber 20, and has its surface formed to be curved. Overheated steam jetted out sideward through a jet-out cover 61, which will be described below, toward the reflective portion 68 is reflected by the reflective portion 68 so as to be led below the article-to-be-heated F.

To the ceiling surface of the heating chamber 20, there is fitted the jet-out cover 61 which is formed out of a stainless-steel plate and jets out overheated steam. On the front side of a right-side part of the jet-out cover 61, an illuminating device 69 that illuminates inside the heating chamber 20 is provided.

The jet-out cover 61 is formed to be substantially hexagonal, which is achieved by both corners at the front of a rectangle as seen in a plan view being chamfered. Both the upper surface and the lower surface of the jet-out cover 61 are finished to be dark-colored through surface treatment such as painting. Thus, heat radiated from a steam heating heater 41 (see FIG. 5) is absorbed in the jet-out cover 61 to be radiated from the bottom surface thereof to the heating chamber 20.

In the bottom surface and the circumferential surface of the jet-out cover 61, a plurality of jet ports 65 and 66 (see FIG. 5) are provided. Rims of jet ports 65 and 66 are formed to be cylindrical so that streams can be guided in the axis directions of the jet ports 65 and 66.

FIG. 5 shows an outline of the structure inside the steam cooker 1. In the diagram, the heating chamber 20 is seen from a side. The water tank 71 is arranged to the left of the heating chamber 20 as shown in FIG. 3 mentioned earlier, and is connected via a joint portion 58 with a tank-water-level detection container 91. Thus, the water tank 71 is detachable from the cabinet 10 (see FIG. 2).

The tank-water-level detection container 91 is provided with a tank-water-level detection portion 56. The tank-water-level detection portion 56 has a plurality of electrodes and, by the conduction between electrodes, detects water level. In this embodiment, water level is detected at three levels by a ground electrode and three detection electrodes. By detection of the tank-water-level detection portion 56, when the level of water in the water tank 71 falls below a predetermined water level, a notification is given to recommend feeding of water.

A water feed passage 55 extends to a bottom part of the tank-water-level detection container 91 so as to be immersed. The water feed passage 55 has a water feed pump 57 provided somewhere along the path, and is connected to the steam generation device 50. The steam generation device 50 has a cylindrical pot 51 of which the axis direction is vertical, and, by operation of the water feed pump 57, water is fed from the water tank 71 to the pot 51.

The pot 51 is formed to be cylindrical with metal, synthetic resin, ceramic, a combination of these different materials, or the like, and is heat resistant. In the pot 51, a steam generation heater 52 comprising a spiral sheathed heater is immersed. By energization of the steam generation heater 52, the water in the pot 51 is heated, and steam is generated.

In the pot 51, a cylindrical separation wall 51a is provided that extends from the top surface of the pot 51 into the spiral steam generation heater 52. By the separation wall 51a, a water-level detection chamber 51b is formed that is separated from the steam generation heater 52. The separation wall 51a is formed so as to have a gap between the bottom surface of the port 51, and, by the inside and the outside of the water-level detection chamber 51b communicating with each other, water is maintained at the same level.

In the water-level detection chamber 51b, there is provided a pot-water-level detection portion 81 that detects the level of water in the pot 51. The pot-water-level detection portion 81 has a plurality of electrodes and, by the conduction between electrodes, detects the level of water in the pot 51. Since the steam generation heater 52 and the water-level detection chamber 51b are separated by the separation wall 51a, bubbles that are caused by boiling of water that has touched the steam generation heater 52 are less likely to conduct to the water-level detection portion 81. Thus, it is possible to avoid energization of electrodes caused by bubbles, and to enhance the accuracy of detection of the pot-water-level detection portion 81.

A heater or the like may be adhered to an outer circumferential surface of the pot 51 to heat the water in it. Here, a circumferential wall of the pot 51 forms heating portion for heating the water in the pot 51, and the water-level detection chamber 51b is provided to be separate from the circumferential wall of the pot 51. Moreover, the steam generation heater 52 may comprise an IH heater.

From the top surface of the pot 51, a steam feed duct 34 connected to a circulation duct 35 described below leads out. In an upper part of the circumferential surface of the pot 51, there is provided an overflow water pipe 98 communicating with the tank-water-level detection container 91. Thus, water that has overflowed from the pot 51 is led to the water tank 71. The overflow level of the overflow pipe 98 is set to be higher than the normal water level in the pot 51 but lower than the steam feed duct 34.

From the bottom end of the pot 51, a water drain pipe 53 leads out. Somewhere along the path of the water drain pipe 53, a drain valve 54 is provided. The water drain pipe 53 runs toward a drained-water collection portion 71a provided in the water tank 71 with a slope at a predetermined angle. Thus, it is possible to drain the water in the pot 51, by opening the drain valve 54, into the drained-water collection portion 71a to collect it, and to throw the drained water away by detaching the water tank 71.

At the outside wall of the heating chamber 20 from its rear surface over to its top surface, a circulation duct 35 is provided. The circulation duct 35 has a suction port 28 formed in the rear wall of the heating chamber 20, and is connected to a steam heating device 40 arranged in an upper part of the heating chamber 20. The steam heating device 40 has its bottom surface covered with the jet-out cover 61, and its top surface covered with a top cover 47.

In the circulation duct 35, a blower fan 26 comprising a centrifugal fan is arranged, and the steam feed duct 34 is connected at the upstream side of the blower fan 26. By driving of the blower fan 26, steam generated by the steam generation device 50 flows via the steam feed duct 34 into the circulation duct 35. In addition, the steam in the heating chamber 20 is sucked in through the suction port 28, flows through the circulation duct 35, and jets out through the jet ports 65 and 66 of the jet-out cover 61 to be circulated. Since jetting out and sucking in of steam are performed by a common blower fan 26, it is possible to prevent an increase in the cost of the steam cooker 1.

Initially, gas inside the heating chamber 20 is air, however, when steam cooking starts, air is replaced with steam. In the following description, it is assumed that gas inside the heating chamber 20 has been replaced with steam.

In an upper part of the circulation duct 35, an exhaust duct 33 that branches out via an electrically driven damper 48 is provided. The exhaust duct 33 has an open end facing outside, and, by opening the damper 48 and driving the blower fan 26, the steam in the heating chamber 20 is forcibly exhausted. From a lower part of the heating chamber 20, an exhaust duct 32 that is communicated via the exhaust port 32*a* leads out. The exhaust duct 32 is formed of metal such as stainless steel, and has an open end facing outside to naturally exhaust the steam in the heating chamber 20.

The steam heating device 40 is provided with the steam heating heater 41 comprising a sheathed heater, and further heats the steam generated by the steam generation device 50 to generate overheated steam. The steam heating device 40 is arranged in a middle part of a ceiling part of the heating chamber 20 as seen in a plan view. In addition, the steam heating device 40 is formed with an area smaller than the ceiling surface of the heating chamber 20 and with a small volume, so as to achieve high heating efficiency.

In a lower part at a side of the heating chamber 20, there is provided a drain portion 110 that drains condensed water collected on a floor surface 20*a* of the heating chamber 20. The drain portion 110 is provided with a drain tray 114, pipes 111 and 113, and a tube pump 115. The drain tray 114 is detachably arranged below the door 11, and collects condensed water transported through the drain portion 110. In addition, the condensed water adhered on the inner surface of the door 11 is made to flow down, when the door 11 is opened, so as to be collected in the drain tray 114.

The pipe 111 is formed of a resin-formed bent pipe that is provided to project through a side wall of the heating chamber 20 (to facilitate understanding, in FIG. 5, the pipe 111 is shown at the rear wall). The end of the pipe 111 is separated from, with a gap in between, the floor surface 20*a* of the heating chamber 20 to form a drain hole 111*a* that is open downward. The drain hole 111*a* is provided with a mesh filter (unillustrated). The pipe 113 is formed out of a resin pipe, and is open to face the drain tray 114. Between the pipes 111 and 113 is communicated with a flexible tube 112 formed of silicon rubber or the like.

In the tube pump 115, a rotated plate 117 is provided inside a housing 116 that has the shape of a cylinder with a base, and in a peripheral part of the rotated plate 117, a plurality of rollers 118 are provided to project out. A tube 112 is arranged in a ring shape along the inner circumferential wall of the housing 116. Between the housing 116 and the rollers 118 is formed to be narrower than the outside diameter of the tube 112, so that the tube 112 is pressed by the rollers 118.

When the rotated plate 117 rotates in the direction indicated by an arrow A by driving of the tube pump 115, the rollers 118, while rotating along the length direction of the tube 112, successively press the tube 112. Thus, the fluid inside the tube 112 is pushed out successively in one direction to be transported, preventing the fluid from flowing in the opposite direction.

Condensed water collected on the floor surface 20*a* of the heating chamber 20 is sucked in through the drain hole 111*a* to be transported to the drain tray 114. The water collected on the drain tray 114 is thrown away by detaching the drain tray 114. This makes it possible to drain water while maintaining the air-tightness inside the heating chamber 20. Note that condensed water may be transported to the drained-water collection portion 71*a* of the water tank 71 by the tube pump 115.

Figure 6:
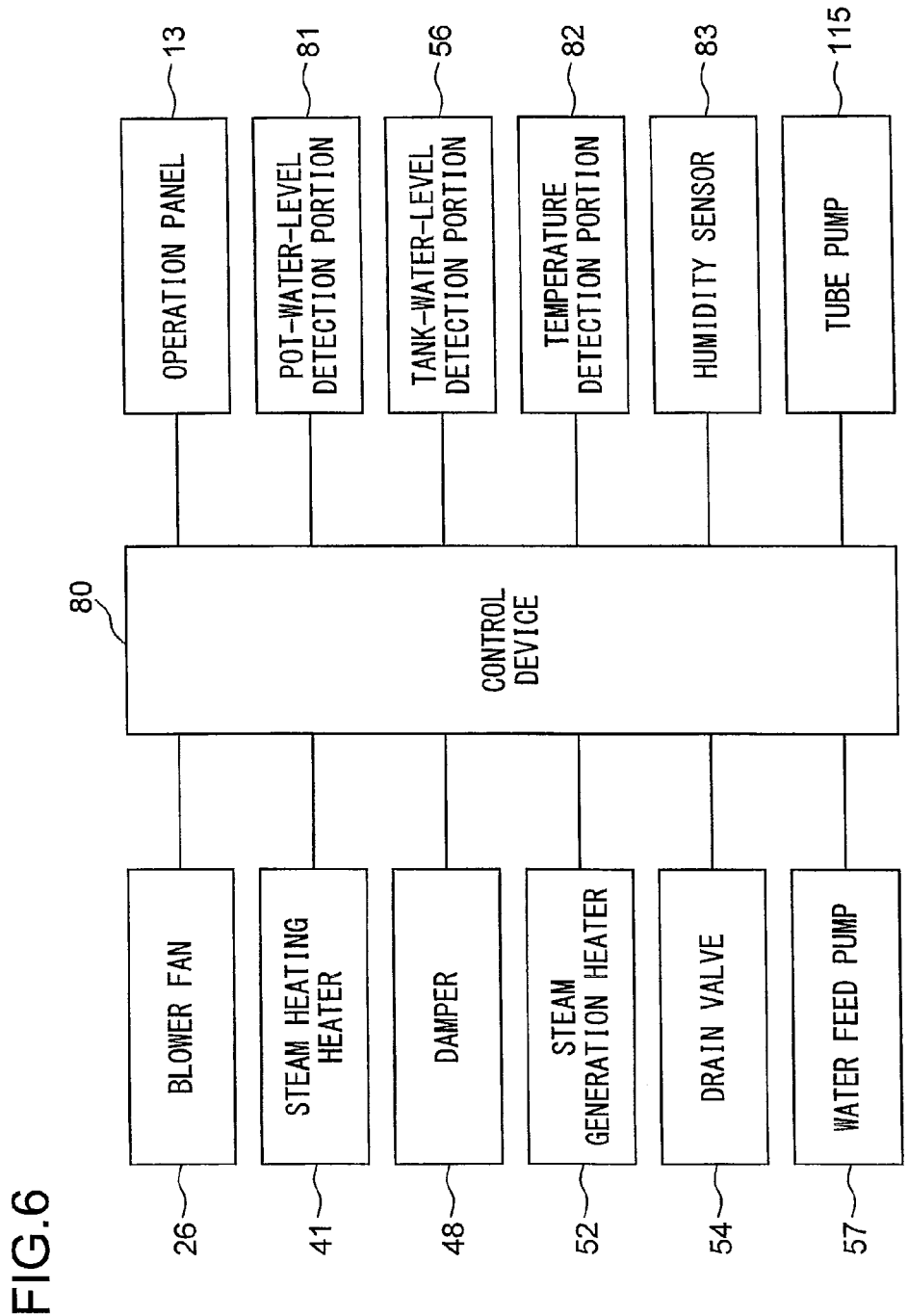
[FIG. 6] A block diagram showing the structure of the steam cooker according to the first embodiment of the invention.

FIG. 6 is a block diagram showing the design of the control of the steam cooker 1. The steam cooker 1 is provided with a control device 80 having a microprocessor, a memory, and a timer. To the control device 80, there are connected the blower fan 26, the steam heating heater 41, the damper 48, the steam generation heater 52, the drain valve 54, the water feed pump 57, the operation panel 13, the pot-water-level detection portion 81, the tank-water-level detection portion 56, a temperature sensor 82, a humidity sensor 83, and the tube pump 115. The control device 80 controls individual parts according to a predetermined program, so that the steam cooker 1 is driven.

The operation panel 13 has a display portion (unillustrated) and indicates the status of control on the display portion. Operation commands are inputted via various operation keys arranged on the operation panel 13. The operation panel 13 is provided also with a sound production device (unillustrated) that produces various sounds. The temperature sensor 82 detects the temperature inside the heating chamber 20. The humidity sensor 83 detects the humidity inside the heating chamber 20.

By the control of the control device 80, electric power is supplied from the power source (unillustrated) to the steam heating heater 41 and to the steam generation heater 52. Here, the supply of electric power to the steam heating heater 41 and to the steam generation heater 52 is distributed according to the duty ratio. Specifically, switching is performed such that the steam generation heater 52 is off when the steam heating heater 41 is on, and that the steam generation heater 52 is on when the steam heating heater 41 is off. Thus, as the duty ratio of the supply of electric power to one of the steam heating heater 41 and the steam generation heater 52 increases, the duty ratio of the supply of electric power to the other decreases.

In the steam cooker 1 designed as described above, the door 11 is opened and the water tank 71 is pulled out from the water tank chamber 70 to put water in the water tank 71. Filled with water, the water tank 71 is pushed into the water tank chamber 70 and, via the joint portion 58, connected to the tank-water-level detection container 91. An article-to-be-heated F is placed on the rack 22, the door 11 is closed, and, by operation of the operation panel 13, a cooking menu is selected. Then, by pressing a start key (unillustrated), a cooking sequence corresponding to the cooking menu starts. This allows the water feed pump 57 to start operation, so that water is fed to the steam generation device 50. Here, the drain valve 54 is closed.

By driving of the water feed pump 57, water is fed via the water feed passage 55 into the pot 51, and when the water in the pot 51 reaches a predetermined level, by detection of the pot-water-level detection portion 81, feeding of water is stopped. Here, by the tank-water-level detection portion 56, the level of water in the water tank 71 is monitored, and when the water in the water tank 71 is not enough for cooking, a warning is notified.

When a predetermined amount of water is put in the pot 51, the steam generation heater 52 is energized, and the steam generation heater 52 heats the water in the pot 51 directly. At the same time the steam generation heater 52 is energized, or at the time the water in the pot 51 reaches a predetermined temperature, the blower fan 26 and the steam heating heater 41 are energized. Here, the electric power (for example, 1000

W) supplied to the steam generation heater 52 is larger than the electric power (for example, 300 W) supplied to the steam heating heater 41.

By driving of the blower fan 26, the steam in the heating chamber 20 is sucked through the suction port 28 into the circulation duct 35. In addition, when the water in the pot 51 boils, saturated steam at 100° C. and at one atmosphere is generated, and the saturated steam flows via the steam feed duct 34 into the circulation duct 35. Here, the damper 48 is closed. The steam blown out by the blower fan 26 flows through the circulation duct 35 into the steam heating device 40.

The steam that has flowed into the steam heating device 40 is heated by the steam heating heater 41, and is thus turned into overheated steam at 100° C. or more. Normally, overheated steam that is heated up to 150° C. to 300° C. is used. Since the supply of electric power to the steam generation heater 52 is larger than that to the steam heating heater 41, with a large amount of overheated steam being fed to the heating chamber 20, a first cooking step is performed.

Part of the overheated steam jets out straight downward (an arrow B) through jet holes 65. In this way, the top surface of the article-to-be-heated F touches the overheated steam. In addition, part of the overheated steam jets out sideways obliquely downward through jet ports 66. The overheated steam jetted out sideways is reflected by the reflection portion 68 to be led below the article-to-be-heated F. In this way, the bottom surface of the article-to-be-heated F touches the overheated steam.

When the temperature of the surface of the article-to-be-heated F is 100° C. or less, overheated steam condenses on the surface of the article-to-be-heated F. The condensation heat (latent heat) is as large as 539 cal/g; thus, in addition to convective heat transfer, a large amount of heat can be applied to the article-to-be-heated F. Thus, the article-to-be-heated F has its internal temperature raised quickly.

In addition, part of the overheated steam jets out through jet ports 66—formed at the front of the jet-out cover 61—obliquely downward toward the door 11. The steam in the heating chamber 20 is sucked in by the blower fan 26 through the suction port 28. By this suction force, the flow of overheated steam jetted out frontward is bent to be led rearward. Thus, part of the overheated steam collides with a front part of the top surface of the article-to-be-heated F, and part of the overheated steam is led from the front of the article-to-be-heated F to the bottom thereof. As a result, the overheated steam reaches a front part of the heating chamber 20, and thus heating shortage at a front part of the article-to-be-heated F is prevented, and the article-to-be-heated F can be cooked evenly.

Since the overheated steam in the heating chamber 20 is sucked in through the suction port 28, it is possible to reduce high-temperature overheated steam that strikes the door 11 directly. Accordingly, there is no need to use a door 11 with high heat resistance to prevent the door 11 from being heated, and thus increased cost of the steam cooker 1 can be prevented.

When the suction force of the blower fan 26 is made small, the flow of the overheated steam jetted out frontward is bent at a lower part of the heating chamber 20. This makes it possible to lead an even larger amount of overheated steam to the bottom surface of the article-to-be-heated F. When the suction force of the blower fan 26 is made large, the flow of the overheated steam jetted out frontward is bent at an upper part of the heating chamber 20. This makes it possible to lead an even larger amount of overheated steam to the top surface of the article-to-be-heated F.

When the amount of steam in the heating chamber 20 increases as time advances, excessive steam is exhausted out through the exhaust duct 32.

The overheated steam that has jetted out through the jet ports 65 and 66 applies heat to the article-to-be-heated F, is then sucked through the suction port 28 into the circulation duct 35 and flows into the steam heating device 40. In this way, the steam in the heating chamber 20 repeatedly circulates, and thereby cooking is performed.

Figure 7:
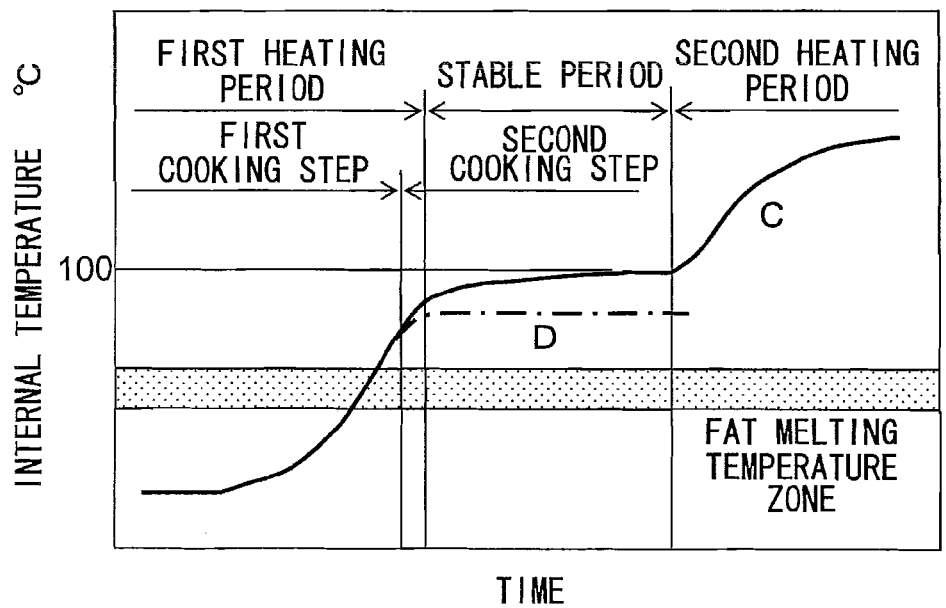
[FIG. 7] A diagram showing a variation in the internal temperature of an article-to-be-heated due to overheating by overheated steam.

FIG. 7 shows a variation in the internal temperature of the article-to-be-heated F due to heating by overheated steam. The vertical axis indicates the internal temperature (in degrees) of the article-to-be-heated F, and the horizontal axis indicates time. In the diagram, as indicated by a solid line C, when overheated steam is fed, the article-to-be-heated F has its internal temperature raised rapidly in a substantially rectilinear manner in a first heating period. That is, in the first heating period, the rate of temperature variation in the internal temperature is substantially constant.

Since the article-to-be-heated F contains moisture, when the internal temperature is raised close to 100° C., the moisture gradually esteamates. Since a large amount of heat is required to esteamate moisture, the rate of temperature variation in the internal temperature becomes small. Thus the period proceeds to a stable period in which the temperature rise is more gradual than in the first heating period. Then, when all the moisture in the article-to-be-heated F esteamates, switching is performed to a second heating period in which the internal temperature is rapidly raised again.

In the memory of the control device 80, cooking sequence data is stored. The cooking sequence data includes data of the time at which the first cooking step is switched to the second cooking step based on a fat melting temperature characteristic depending on the type of the article-to-be-heated F. In the article-to-be-heated F such as meat, when a fat melting temperature zone of about 30 to 60° C. is exceeded, fat contained inside it melts and starts to ooze out.

The fat melting temperature characteristic varies depending on individual foods; for example, the fat melting temperature zone of pork is about 33 to 46° C., and the fat melting temperature zone of beef is about 40 to 50° C. Specifically, the cooking sequence data includes, depending on the type of an article-to-be-heated F, data of the time at which the internal temperature becomes a predetermined temperature that exceeds the fat melting temperature zone but is less than or equal to 100° C.

Depending on the volume of the article-to-be-heated F, cooking conditions of the first cooking step, etc., the variation in temperature inside the article-to-be-heated F varies. Thus, the cooking sequence data includes variable data for varying the switching time based on the volume of the article-to-be-heated F and cooking conditions of the first cooking step. The switching time of the first and the second cooking steps is varied so as to be delayed when the volume of the article-to-be-heated F is large, and to be put forward when the volume of the article-to-be-heated F is small.

The volume of the article-to-be-heated is inputted at the start of cooking via the operation panel 13 (portion via which the volume of the article-to-be-heated is inputted). The cooking time from the start of cooking is counted by a timer in the control device 80 (see FIG. 6). When the timer counts a switching time that is acquired from the cooking sequence data, the internal temperature of the article-to-be-heated F is judged to have exceeded the fat melting temperature zone. Thus, as indicated by a dash-dot line D in the diagram, the step proceeds to the second cooking step.

Here, the first cooking step is switched to the second cooking step at the time switching is performed from the first heating period, in which the internal temperature of the article-to-be-heated F is raised by overheated steam within a range of 100° C. or less, to the stable period. That is, at the time at which the rate of temperature variation in the internal temperature of the article-to-be-heated F becomes small from a substantially constant state, the first cooking step is switched to the second cooking step. Thus, the internal temperature of the article-to-be-heated can be maintained at a proper temperature at 100° C. or less.

In the memory of the control device 80, variations in the internal temperature of the article-to-be-heated F corresponding to the type, the volume, the cooking conditions of the first cooking step, etc of the article-to-be-heated F. may be stored previously as data base. The cooking sequence database monitors the database and, when the cooking time from the start of cooking counted by the timer reaches the time at which the internal temperature reaches a predetermined temperature, the step proceeds to the second cooking step.

The predetermined internal temperature here is a value of the fat melting temperature zone of the article-to-be-heated with about 20° C. to 30° C. added to it; that is, it is set at about 60° C. to 80° C. Thus, variations in the temperature of foods can be reduced, and thus stable control is possible, which is preferable.

The surface temperature of the article-to-be-heated F corresponding to the internal temperature of the article-to-be-heated F, temperatures inside the heating chamber 20 and wall surfaces thereof, and the like may be stored as database and, by detection of these, the time at which the first cooking step is switched to the second cooking time may be judged.

Furthermore, the time at which the first cooking step is switched to the second cooking step may be judged by the amount of steam fed to the heating chamber 20. Specifically, by feeding of steam, the internal temperature of the article-to-be-heated F is raised rapidly in the first heating period, and then the rate of temperature variation in the internal temperature becomes small in the stable period and thus the temperature rise becomes gradual.

When the rate of temperature variation is small, the internal temperature of the article-to-be-heated F becomes even higher when the amount of steam fed in the first cooking step is increased, but, when the steam feed amount increases more than a predetermined amount, the temperature is not raised from that temperature but is saturated. When a predetermined amount of steam equal to or less than the amount of steam at this time is fed in the first cooking step, switching to the second step is performed. This makes it possible to reduce electric power consumption caused by excessive steam that does not contribute to defatting effect. It is also possible to prevent increased cooking time caused by feeding of steam more than necessary.

In the second cooking step, the steam generation heater 52 is stopped, and the maximum electric power (for example, 1300 W) is supplied to the steam heating heater 41. Thus, the article-to-be-heated F is heated mainly at its surface, has its internal temperature maintained at a desired temperature (for example, 70 to 80° C.) that exceeds the fat melting temperature zone, and has its surface roasted brown. Here, the steam generation heater 52 may be supplied with an electric power smaller than that supplied to the steam heating heater 41.

Figure 8:
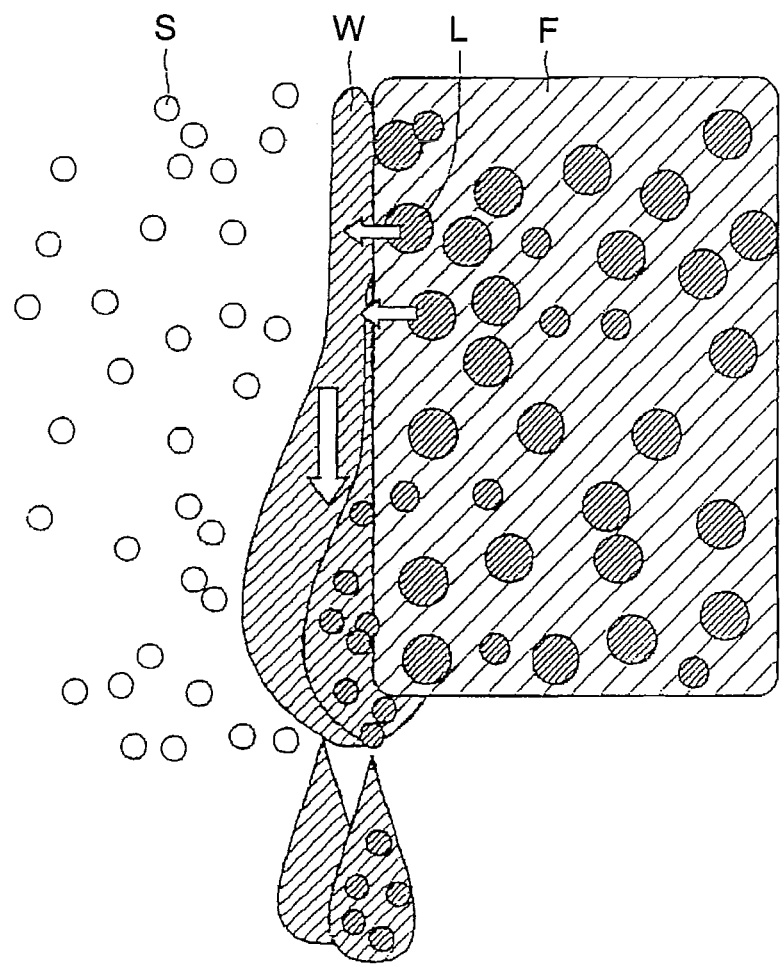
[FIG. 8] A diagram illustrating defatting of the article-to-be-heated by overheated steam.

As shown in FIG. 8, when the temperature is maintained higher than the fat melting temperature zone, the article-to-be-heated F has fat L melted and, due to contraction of the article-to-be-heated F, the fat L melts out of the surface. Condensed water W, which is steam S condensed on the surface of the article-to-be-heated F, takes in the fat L and flows down. Thus, the article-to-be-heated F is defatted.

When the second cooking step is performed for a predetermined time, a desirable surface condition of the article-to-be-heated F is achieved, and cooking ends. Then, by the control device 80, completion of cooking is indicated on the display portion of the operation panel 13 and an alert is sound to notify. When a user who has been notified the completion of cooking opens the door 11, the damper 48 opens and the steam in the heating chamber 20 is quickly and forcibly exhausted through the exhaust duct 33. Thus, the user can take out the article-to-be-heated F safely, without touching high-temperature steam, from inside the heating chamber 20.

Figure 9:
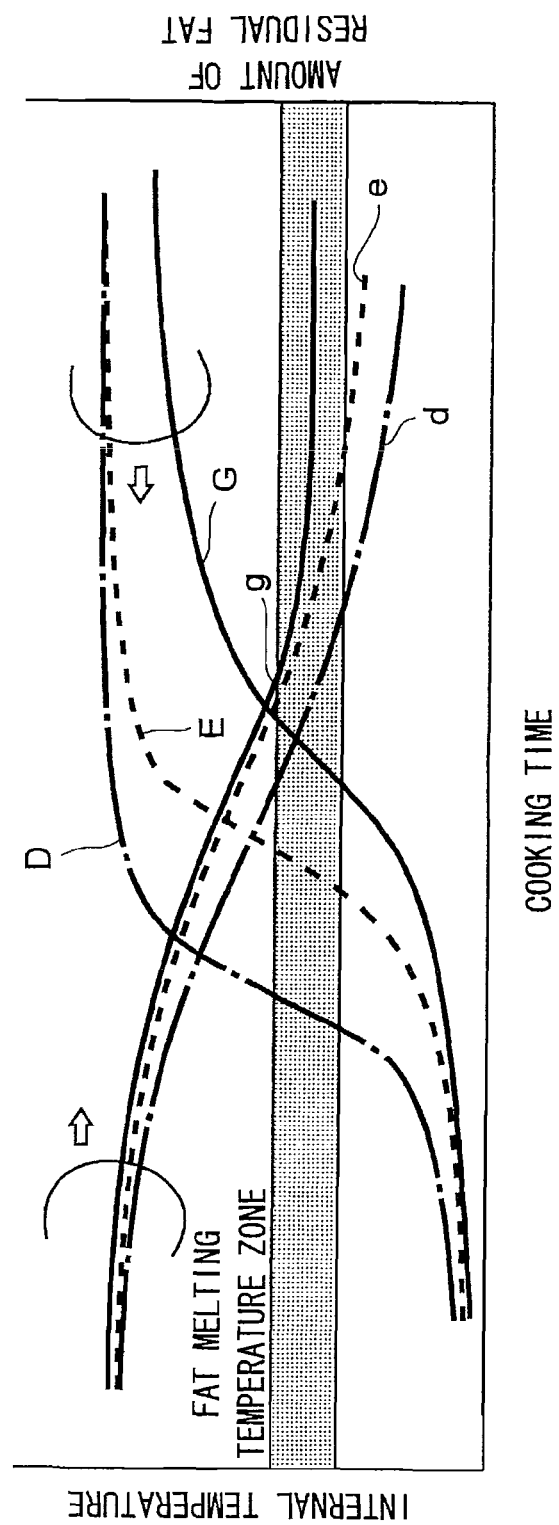
[FIG. 9] A diagram showing the internal temperature and the amount of residual fat of the article to be heated by the steam cooker of the first embodiment of the invention.

FIG. 9 shows variations in the internal temperature and the amount of residual fat of the article-to-be-heated F according to cooking of this embodiment. Of the vertical axes, the scale on the left side represents the internal temperature, the scale on the right side represents the amount of residual fat; the horizontal axis represents cooking time. In the diagram, dash-dot lines D and d represent the internal temperature and the amount of residual fat of the article-to-be-heated F, respectively, according to cooking of this embodiment. In the first cooking step, the steam generation heater 52 is supplied with an electric power of 1000 W, and the steam heating heater 41 is supplied with an electric power of 300 W. In the second cooking step, the steam generation heater 52 is stopped, and the steam heating heater 41 is supplied with an electric power of 1300 W, which is switched when the internal temperature of the article-to-be-heated F is 70° C. Note that the dash-dot line D is the same dash-dot line D in FIG. 7 mentioned earlier.

In the diagram, broken lines E and e indicate a first comparative example, and indicate the internal temperature and the amount of residual fat, respectively, when the supply of electric power to the steam generation heater 52 is kept constant at 260 W, and that to the steam heating heater 41 is kept constant at 1040 W. In addition, in the diagram, solid lines G and g indicate a second comparative example, and indicate the internal temperature and the amount of residual fat, respectively, when the steam heating heater 41 is stopped and the supply of electric power to the steam generation heater 52 is kept constant at 1300 W. Table 1 presents the cooking time, the amount of steam, and the amount of defatting according to cooking under different conditions just mentioned.

TABLE 1

|  | Cooking Time (minute) | Steam Amount (g) | Defatting Amount (%) |
|---|---|---|---|
| Embodiment | 17 | 52 | 58.8 |
| Comparative Example 1 | 19 | 73 | 58.0 |
| Comparative Example 2 | 15 | 0 | 53.6 |

Based on FIG. 9 and Table 1, in this embodiment, a large amount of overheated steam is fed to the heating chamber 20, and thus the internal temperature of the article-to-be-heated F rises quickly as indicated by the dash-dot line D. By contrast, in the first comparative example, the amount of overheated steam is small, and thus rising of the internal temperature is slow as indicated by the broken line E. In addition, in the second comparative example, there is no overheated steam, and thus rising of the internal temperature is even slower as indicated by the solid line G.

Thus, in this embodiment, it is possible to exceed the fat melting temperature zone in an early stages and lengthen the period in which the temperature is higher than the fat melting temperature zone. Thus, the amount of defatting of the article-to-be-heated is large. Since the internal temperature of the article-to-be-heated becomes high in an early stages, cooking time is reduced. Furthermore, it is possible to reduce the amount of usage of steam, and thus to lessen the frequency of feeding water to the water tank 71, enhancing usability of the steam cooker 1.

Since this embodiment has the first cooking step in which the article-to-be-heated F is cooked by overheated steam with the supply of electric power to the steam generation heater 52 being larger than that to the steam heating heater 41, it is possible to quickly raise the internal temperature of the article-to-be-heated F such as meat by latent heat of a large amount of overheated steam. Thus, the internal temperature of the article-to-be-heated F can be made higher than the fat melting temperature zone in an early stages.

Moreover, after the internal temperature of the article-to-be-heated F has exceeded the fat melting temperature zone and fat starts to ooze out, switching to the second cooking step is performed in which the steam generation heater 52 is stopped and the steam heating heater 41 is supplied with the maximum electric power; thus, cooking can be completed with the internal temperature of the article-to-be-heated F maintained at a desired temperature and with the surface thereof roasted brown.

Accordingly, it is possible to secure a proper amount of moisture inside the article-to-be-heated F to maintain taste, and, without lengthening cooking time, to lengthen the period in which the temperature is higher than the fat melting temperature zone. Thus, without lowering the usability of the steam cooker 1, the amount of defatting of the article-to-be-heated F can be increased and thus healthy cooking can be performed. Since the internal temperature of the article-to-be-heated F becomes high in an early stages, cooking time can be reduced. When the amount of defatting of the article-to-be-heated is to be similar to a conventional amount, cooking time can be reduced further.

Since the cooking sequence data includes data of the time at which the first cooking step is switched to the second cooking step of individual article-to-be-heated F based on the fat melting temperature characteristic depending on the type of articles-to-be-heated F, it is possible to switch the first and the second cooking steps at an optimal time depending on the type of the article-to-be-heated F such as pork or beef. Accordingly, satisfactory cooking can be performed.

Moreover, based on input information from the operation panel 13 (portion via which the volume of the article-to-be-heated is inputted) via which the volume of the article-to-be-heated is inputted, the time is varied at which the first cooking step is switched to the second cooking step; thus, with an optimal timing according to the volume of the article-to-be-heated F, the first cooking step can be switched to the second cooking step. Accordingly, further satisfactory cooking can be performed.

In the first cooking step, the steam heating heater 41 may be stopped and the steam generation heater 52 may be supplied with the maximum electric power. In this way, cooking is performed with saturated steam being fed to the heating chamber 20 and, in the second cooking step, by heating by the steam heating heater 41, cooking is performed with overheated steam. Even saturated steam has the same latent heat as overheated steam and, by the steam generation heater 52 with the maximum electric power, an even more steam is fed. Thus, it is possible to raise the internal temperature of the article-to-be-heated F further quickly, to increase the amount of defatting, and to reduce cooking time.

In the second cooking step, so long as the supply of electric power to the steam generation heater 52 is made smaller than that to the steam heating heater 41, a similar effect can be obtained. However, if the steam generation heater 52 is stopped in the second cooking step, it is possible to feed a large electric power to the steam heating heater 41 and thus complete cooking at an even earlier stage.

Since the supply of electric power is switched between the steam heating heater 41 and the steam generation heater 52, keeping one out of operation makes it possible to keep the other in continuous operation. Thus, it is possible to prevent electric power loss due to the temperature drop of the heater that has been stopped and thus to reduce electric power consumption.

Moreover, since the first cooking step is switched to the second cooking step at the time switching is performed from the first heating period, in which the rate of temperature variation in the internal temperature of the article-to-be-heated F is substantially constant, to the stable period, in which the rate of temperature variation in the internal temperature of the article-to-be-heated F becomes small, it is possible to maintain the internal temperature of the article-to-be-heated F at an appropriate temperature equal to or less than 100° C. It is therefore possible to easily realize cooking in which reduction in moisture of the article-to-be-heated F is prevented and hence taste is maintained. Note that the first cooking step may be switched to the second cooking step within the first heating period.

Moreover, it is further desirable that the first cooking step be switched to the second cooking step when the internal temperature of the article-to-be-heated F is 60 to 80° C. This makes it possible to further reduce reduction of moisture in the article-to-be-heated F and thus to further improve taste.

When switching to the second cooking step is performed before the internal temperature of the article-to-be-heated F becomes about 10° C. higher than the fat melting temperature, the melting amount of fat is lessened in an early stages in the second cooking step in which the internal temperature is less likely to rise. Thus, it is desirable that the first cooking step be switched to the second cooking step when the internal temperature of the article-to-be-heated F becomes 10° C. or more higher than the fat melting temperature. In this way, the switching time is reached quickly by overheated steam and, by melting a large amount of fat from an early stage in the second cooking step, defatting effect can be improved without lengthening cooking time.

In this embodiment, although the steam heating heater 41 is arranged at the ceiling surface of the heating chamber 20, it may be arranged in a duct communicating with the heating chamber 20. That is, a convection type may be adapted in which the article-to-be-heated F is heated by hot air in the second cooking step. However, when the steam heating heater 41 is arranged at the ceiling surface of the heating chamber 20 as in this embodiment, the article-to-be-heated F is heated by radiation heat. Thus, the article-to-be-heated F can easily be roasted brown, and thus cooking time can be further reduced. Here, the blower fan 26 may be stopped to stop circulation of steam. This makes it possible to save electric power.

Next, a second embodiment will be described. This embodiment is designed like the first embodiment shown in FIGS. 1 to 9 mentioned above, and has a cooking mode different from that in the first embodiment. In this embodiment, there is provided a cooking mode (hereinafter, "the large food mode") provided for an article-to-be-heated F whose volume is large such as roast beef. When an article-to-be-heated F with a large volume is placed inside the heating chamber 20, the large-food mode is selected and, by pressing the start key (unillustrated), a cooking sequence starts.

Figure 10:
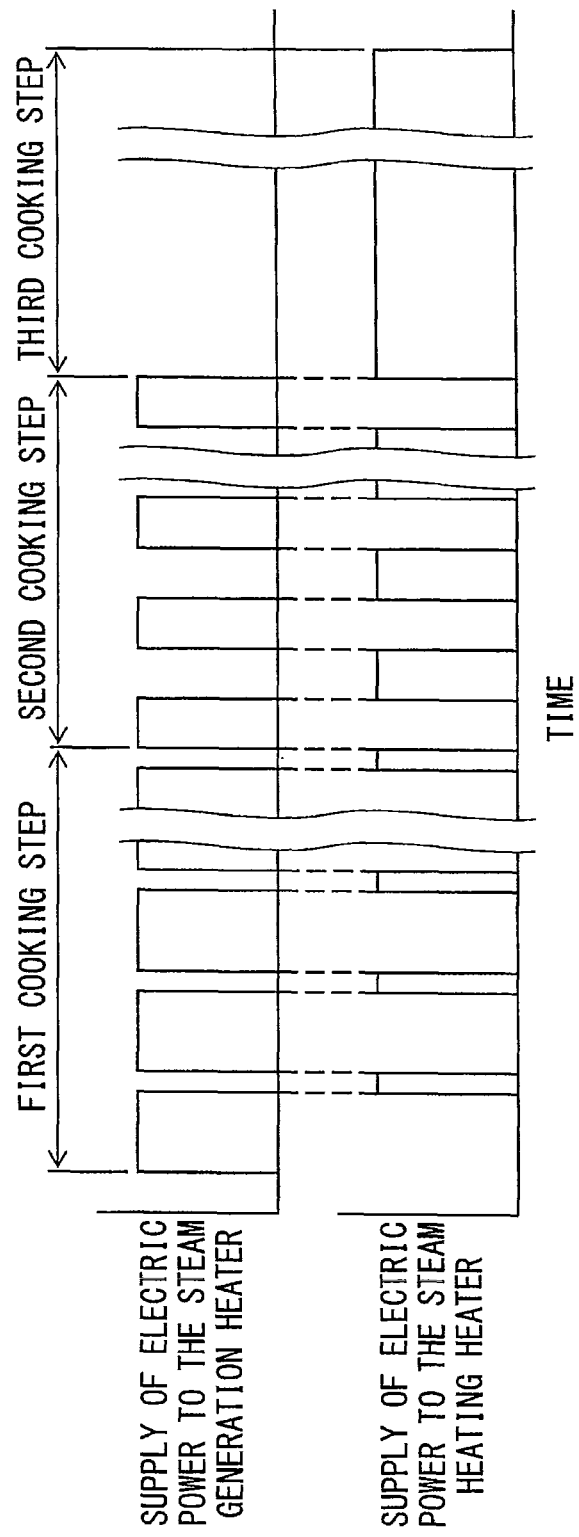
[FIG. 10] A diagram showing a control sequence of the supply of electric power to the steam generation heater and to the steam heating heater of a steam cooker according to a second embodiment of the invention.

FIG. 10 shows a control sequence of the supply of electric power to the steam generation heater 52 and to the steam heating heater 41. The vertical axis represents the ON/OFF states of the steam generation heater 52 and the steam heating heater 41, and the horizontal axis represents cooking time. The steam generation heater 52 and the steam heating heater 41 are supplied with electric power, which is distributed according to the duty ratio. The large-food mode has a first, a second, and a third cooking steps in which the state of electric power switching is varied.

In the first cooking step, the ON time of the steam generation heater 52 is longer than that of the steam heating heater 41. That is, the duty ratio of the supply of electric power to the steam generation heater 52 is larger than that to the steam heating heater 41. Thus, the steam generation heater 52 is supplied with an electric power of, for example, 1000 W, and the steam heating heater 41 is supplied with an electric power of, for example, 300 W.

In the second cooking step, the ON time of the steam generation heater 52 is shorter than that in the first cooking step, and the ON time of the steam heating heater 41 is longer than that in the first cooking step. That is, the duty ratio of the supply of electric power to the steam generation heater 52 is smaller than that in the first cooking step, and the duty ratio of the supply of electric power to the steam heating heater 41 is larger than that in the first cooking step.

Furthermore, in the second cooking step, the duty ratio of the supply of electric power to the steam generation heater 52 is smaller than that to the steam heating heater 41. Thus, the steam generation heater 52 is supplied with an electric power of, for example, 600 W, and the steam heating heater 41 is supplied with an electric power of, for example, 700 W.

In the third cooking step, the steam generation heater 52 is stopped, and the steam heating heater 41 is supplied with the maximum electric power (for example, 1300 W).

In the first cooking step, since the duty ratio of the supply of electric power to the steam generation heater 52 is larger than that to the steam heating heater 41, a large amount of overheated steam is supplied to the heating chamber 20. Thus, the internal temperature of the article-to-be-heated F rises further quickly than in a normal cooking mode.

Then, when the timer counts the switching time that is acquired from cooking sequence data, the internal temperature of the article-to-be-heated F is judged to have exceeded the fat melting temperature zone. This allows the step to proceed to the second cooking step.

Here, the first cooking step is switched to the second cooking step at the time at which the rate of temperature variation in the internal temperature of the article-to-be-heated F becomes small from a substantially constant state. This makes it possible to maintain the internal temperature of the article-to-be-heated at an appropriate temperature equal to or less than 100° C.

In the second cooking step, by overheated steam generated by the steam generation heater 52 and the steam heating heater 41, the internal temperature of the article-to-be-heated F is raised further. In addition, by heat from the steam heating heater 41, the article-to-be-heated F is heated mainly at its surface so that the surface is roasted brown.

When the second cooking step is performed for a predetermined period, switching to the third cooking step is performed. In the third cooking step, by heat from the steam heating heater 41, the article-to-be-heated F is heated mainly at its surface. This allows the internal temperature of the article-to-be-heated F to be maintained at a desired temperature (for example, 70 to 80° C.) and the surface thereof to be roasted brown. Here, the steam generation heater 52 may be supplied with an electric power smaller than that supplied to the steam heating heater 41. Then, when the second cooking step is performed for a predetermined time, a desirable surface condition of the article-to-be-heated F is achieved, and cooking completes.

According to this embodiment, in the large-food mode, in the first cooking step in an early stages of cooking, the duty ratio of the supply of electric power to the steam generation heater 52 is larger than the duty ratio of the supply of electric power to the steam heating heater 41. Thus, less heat from the steam heating heater 41 is used for raising the internal temperature of the article-to-be-heated F, and, by latent heat of a large amount of overheated steam with high heating efficiency, the internal temperature of the article-to-be-heated F can be raised quickly. Moreover, since the duty ratio of the supply of electric power to the steam generation heater 52 is smaller than that to the steam heating heater 41 in the second and the third cooking steps, it is possible to complete cooking with the internal temperature of the article-to-be-heated F maintained at a desired temperature and with the surface thereof roasted brown.

Furthermore, in the second cooking step, the duty ratio of the supply of electric power to the steam generation heater 52 is smaller than that in the first cooking step and is larger than that in the third cooking step; the duty ratio of the supply of electric power to the steam heating heater 41 is larger than that in the first cooking step and is smaller than that in the third cooking step. If the second cooking step is not provided and if the step is switched from the first cooking step to the third cooking step, when the switching time is early, the internal temperature of the article-to-be-heated F may not be heated to a desired temperature when the surface of the article-to-be-heated F is roasted to completion. On the other hand, when the switching time is late, a circumferential part of the article-to-be-heated F may be heated too much and hence the amount of moisture may not be secured, leading to deteriorated taste.

Thus, the second cooking step is provided as an intermediate cooking step so that the duty ratio of the supply of electric power to the steam generation heater 52 is decreased and the duty ratio of the supply of electric power to the steam heating heater 41 is increased stepwise. This makes it possible to secure the amount of moisture in the circumferential part of the article-to-be-heated F and to obtain a longer period for roasting the surface brown. Accordingly, even with an article-to-be-heated F of which the volume is large such as roast beef, it is possible to shorten the cooking time, and to secure a proper amount of moisture thereinside so that the taste is maintained. The duty ratios of the supply of electric power to the steam generation heater 52 and to the steam heating heater 41 may be varied stepwise by further subdividing from the first cooking step to the third cooking step.

Note that in the third cooking step, so long as the duty ratio of the supply of electric power to the steam generation heater 52 is smaller than that to the steam heating heater 41, a similar effect can be obtained. However, more desirably, the steam generation heater 52 is stopped in the third cooking step as in this embodiment. That is, by feeding a large electric power to the steam heating heater 41, cooking can be completed at an even earlier stage. Moreover, since the steam heating heater 41 is not turned off, it is possible to reduce electric power loss caused by a drop in temperature when the steam heating heater 41 is off. Accordingly, cooking time can be shortened further.

In the first cooking step, the steam heating heater 41 may be stopped and the steam generation heater 52 may be supplied with the maximum electric power. In this way, cooking is performed with saturated steam being fed to the heating chamber 20 and, in the second cooking step, by heating by the steam heating heater 41, cooking is performed with overheated steam. Even saturated steam has the same latent heat as overheated steam and, by the steam generation heater 52 with the maximum electric power, an even larger amount of steam is fed. This makes it possible to raise the internal temperature of the article-to-be-heated F further quickly, to increase the amount of defatting, and to shorten cooking time.

Moreover, when the internal temperature of the article-to-be-heated F exceeds the fat melting temperature zone but is less than or equal to 100° C., the duty ratio of the supply of electric power to the steam generation heater 52 is made smaller than that to the steam heating heater 41; thus, the surface is roasted brown after fat has started to ooze out. It is therefore possible to secure a proper amount of moisture inside the article-to-be-heated F to keep the taste, and to lengthen the period in which the temperature is higher than the fat melting temperature zone. This makes it possible to increase the amount of defatting in the article-to-be-heated and thus perform healthy cooking.

Moreover, the cooking sequence data includes data of the time at which the duty ratio of the supply of electric power to the steam generation heater 52 is made smaller than that to the steam heating heater 41 based on the fat melting temperature characteristic depending on the type of an article-to-be-heated F; thus, depending on the type of the article-to-be-heated F such as pork or beef, switching can be performed at an optimal time. Accordingly, satisfactory cooking can be performed.

Moreover, based on input information of the operation panel 13 (portion via which the volume of the article-to-be-heated is inputted) via which the volume of the article-to-be-heated F is inputted, the time is varied at which the duty ratio of the supply of electric power to the steam generation heater 52 is made smaller than that to the steam heating heater 41; thus, depending of the volume of the article-to-be-heated F, switching can be performed with an optimal timing. Accordingly, further satisfactory cooking can be performed.

Moreover, since the supply of electric power is switched between to the steam heating heater 41 and to the steam generation heater 52, keeping one out of operation makes it possible to keep the other in continuous operation. This makes it possible to prevent electric power loss due to a drop in temperature of the heater that has been stopped and thus to save electric power.

Moreover, the first cooking step is switched to the second cooking step at the time switching is performed from the first heating period, in which the rate of temperature variation in the internal temperature of the article-to-be-heated F is substantially constant, to the stable period, in which the rate of temperature variation in the internal temperature of the article-to-be-heated F becomes small; thus, the internal temperature of the article-to-be-heated F can be maintained at an appropriate temperature equal to or less than 100° C. It is therefore possible to easily realize cooking in which reduction of moisture in the article-to-be-heated F is prevented to maintain the taste. Note that, the first cooking step may be switched to the second cooking step within the first heating period.

Moreover, it is more desirable that the first cooking step be switched to the second cooking step when the internal temperature of the article-to-be-heated F is 60 to 80° C. This makes it possible to further reduce reduction of moisture in the article-to-be-heated F to further improve the taste.

When switching to the second cooking step is performed before the internal temperature of the article-to-be-heated F is about ten degrees higher than the fat melting temperature, the melting amount of fat is lessened in an early stages of the second cooking step in which the internal temperature is less likely to rise. Thus, it is desirable that the first cooking step be switched to the second cooking step after the internal temperature of the article-to-be-heated F becomes ten degrees or more higher than the fat melting temperature. In this way, the switching time is reached quickly by overheated steam, and thus the cooking time can be shortened and, by melting a large amount of fat from an early stage of the second cooking step, defatting effect can be improved.

In this embodiment, in the second cooking step, the duty ratio of the supply of electric power to the steam generation heater 52 may be larger than that to the steam heating heater 41. In this way, by switching from the second cooking step to the third cooking step, the duty ratio of the supply of electric power to the steam generation heater 52 becomes smaller than that to the steam heating heater 41.

That is, the first and the second cooking steps correspond to the first cooking step described earlier, and the third cooking step corresponds to the second cooking step described earlier. Thus, the second cooking step functions as an intermediate cooking step between the first and the third cooking steps.

Here, as described above, the second cooking step may be switched to the third cooking step when the internal temperature of the article-to-be-heated F exceeds the fat melting temperature zone but is less than or equal to 100° C. Moreover, if the second cooking step is switched to the third cooking step at the time at which the rate of temperature variation in the internal temperature of the article-to-be-heated F becomes small from a substantially constant state, the internal temperature of the article-to-be-heated F can be maintained at an appropriate temperature equal to or less than 100° C. Moreover, it is more desirable that the second cooking step be switched to the third cooking step when the internal temperature of the article-to-be-heated F is 60 to 80° C.

Figure 11:
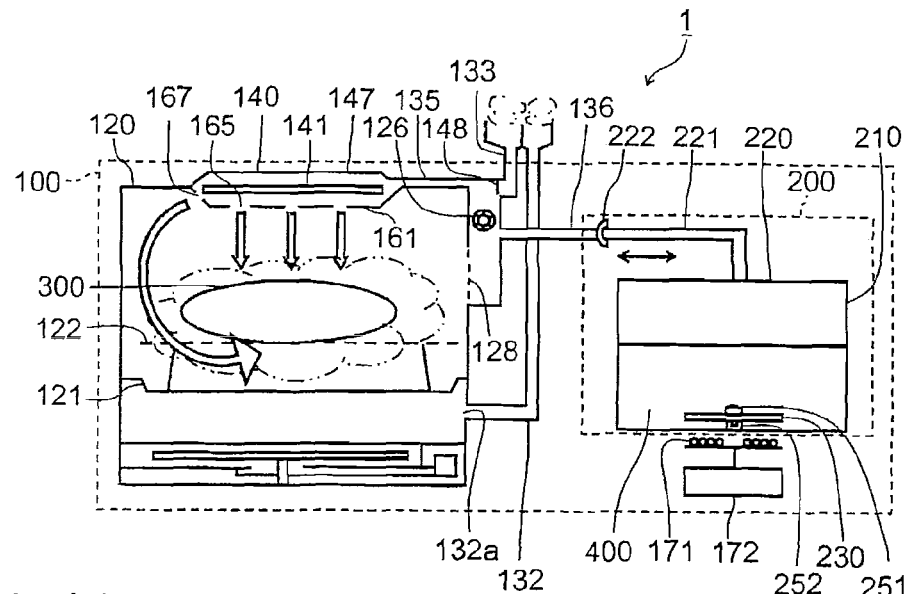
[FIG. 11] A diagram showing an overall structure of a steam cooker according to a third embodiment of the invention.

Next, FIG. 11 is a diagram showing an outline of the structure of a steam cooker according to a third embodiment. The steam cooker 1 is provided with an esteamation cup 200 detachable from the main body 100 which has a control portion (unillustrated). The esteamation cup 200 is a container for containing water 400. Inside the esteamation cup 200, there is arranged a heating member 230 that heats the water 400 to generate steam. The esteamation cup 200 is provided with a steam feed pipe 221 as steam feed portion for feeding steam to the main body 100. The main body 100 is provided with an induction heating coil 171 that induction-heats the heating member 230.

The main body 100 of the steam cooker 1 comprises a cabinet (unillustrated) with the shape of a rectangular parallelepiped. Inside the cabinet, a heating chamber 120 is provided for accommodating a food 300 as an article-to-be-cooked and performing heat-cooking.

The heating chamber 120 has the shape of a rectangular parallelepiped with one face (on the front side) being an opening, and that opening is provided with a door (unillustrated) that is opened/closed when the food 300 is taken out/put in. At an upper part of the door, a handle (unillustrated) is provided. By supporting the handle and rotating the door about the bottom edge, the user can open/close the door. In a middle part of the door, a heat-resistant glass is set to allow the inside of the heating chamber 120 to be visually recognized when the door is closed.

On the right side of the heat-resistant glass, an operation panel (unillustrated) is arranged. The rest of the surfaces of the heating chamber 120 is formed out of stainless steel plates. On the floor surface of the heating chamber 120, a tray 121 formed out of a stainless steel plate is placed and, above the tray 121, a rack 122 formed out of stainless steel wire is placed for placing the food 300 thereon. The user opens the door to place the food 300 on the rack 122 inside the heating chamber 120.

The ceiling surface of the heating chamber 120 is fitted with a jet-out cover 161 for jetting out overheated steam. The jet-out cover 161 is formed of stainless steel. In the jet-out cover 161, a plurality of jet holes 165 and 167 are formed. On the front side of a right-side part of the jet-out cover 161, an illuminating device (unillustrated) for illuminating inside the heating chamber 120 is placed.

In a rear wall on the rear side of the heating chamber 120 at substantially a middle part in the left/right directions, a suction port 128 is provided and, to the bottom left thereof, an exhaust port 132a is provided.

In the outside wall of the heating chamber 120, from the rear surface over to the top surface, a circulation duct 135 is provided. The circulation duct 135 has a suction port 128 opened that is formed in the rear wall of the heating chamber 120, and is connected to a steam heating device 140 placed in an upper part of the heating chamber 120. The bottom surface of the steam heating device 140 is covered with a jet-out cover 161, and the top surface thereof is covered with a top cover 147.

In the circulation duct 135, a blower fan 126 is disposed and, in an upper part of the circulation duct 135, an exhaust duct 133 branches out via an electrically driven damper 148. When the damper 148 is opened and the blower fan 126 is driven, the steam in the heating chamber 120 can be forcibly exhausted through an open end of the exhaust duct 133.

From a bottom part of the heating chamber 120, there leads out an exhaust duct 132 that is communicated via the exhaust port 132a. The exhaust duct 132 is formed of metal such as stainless steel, and has an open end facing outside to naturally exhaust the steam in the heating chamber 120. Note that when cooking is performed with a microwave with a magnetron incorporated in the steam cooker 1, outside air is sucked in via the exhaust duct 132.

The circulation duct 135 is connected with a gas feed pipe 136, which is for leading the steam generated in the esteamation cup 200 to the circulation duct 135, on the rear surface side of the heating chamber 120. The gas feed pipe 136 is connected with the steam feed pipe 221 of the esteamation cup 200. Via a joint portion 222 of the esteamation cup 200, the steam feed pipe 221 and the gas feed pipe 136 are connected together, and then the esteamation cup 200 is placed inside the cabinet of the main body 100.

Figure 12:
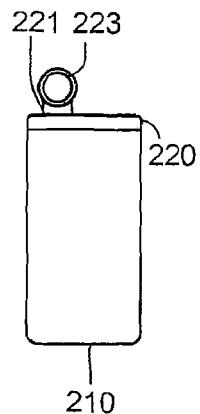
[FIG. 12] A front view showing an esteamation cup of the steam cooker according to the third embodiment of the invention.
Figure 13:
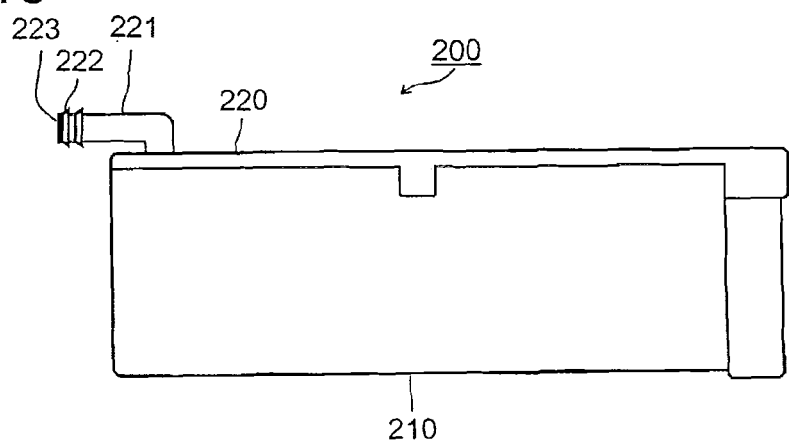
[FIG. 13] A side view showing the esteamation cup of the steam cooker according to the third embodiment of the invention.

FIGS. 12 and 13 are front view and a side view, respectively, showing an outline of the esteamation cup 200. The esteamation cup 200 has a cup portion 210 and a lid portion 220. In an upper part of the cup portion 210, an opening is formed to contain the water 400. The lid portion 220 is so formed as to be detachable from the cup portion 210, and covers the opening of the cup portion 210.

The lid portion 220 is fitted with the steam feed pipe 221 that communicates the outside of the esteamation cup 200 with the inside of the cup portion 210 to let the steam generated inside the cup portion 210 flow through. An outlet port 223 at an end part of the steam feed pipe 221 is provided with the joint portion 222. The joint portion 222 is connected to the gas feed pipe 136 (see FIG. 11) of the main body 100.

Figure 14:
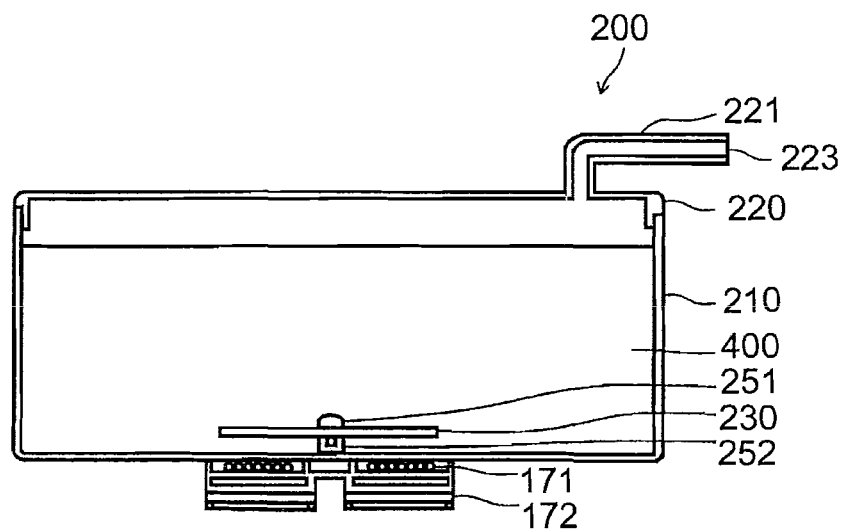
[FIG. 14] A side sectional view showing the esteamation cup of the steam cooker according to the third embodiment of the invention.

FIG. 14 shows a side sectional view of the esteamation cup 200. In a lower part inside the cup portion 210, the plate-like heating member 230 is placed. The heating member 230 is formed of, for example, a magnetic material such as stainless steel. The heating member 230 is put, so as to be almost horizontal, on a fixation rib 252 that projects upward from the bottom surface of the cup portion 210. With a fixation screw 251 that penetrates through the heating member 230 from its top surface to its bottom surface, the heating member 230 is fixed to the fixation rib 252. By unscrewing the fixation screw 251, it is possible to detach the heating member 230 from the cup portion 210 and clean it.

As shown in FIGS. 11 and 14, with the steam feed pipe 221 of the esteamation cup 200 being connected with the gas feed pipe 136 of the main body 100, the esteamation cup 200 is fitted to the main body 100. This allows the heating member 230 placed inside the esteamation cup 200 to face the induction heating coil 171 placed inside the cabinet of the main body 100.

When the control portion controls an IH circuit 172 to drive the induction heating coil 171, an induced current passes through the heating member 230 due to electromagnetic induction of the induction heating coil 171. The resistance heat of this induction current heats the heating member 230. This allows the water 400 contained inside the cup portion 210 to be heated, and steam is generated inside the esteamation cup 200. Accordingly, together the induction heating coil 171 and the heating member 230 form the steam generation heater that generates steam.

The steam generated in the esteamation cup 200 flows through the steam feed pipe 221 of the esteamation cup 200 into the gas feed pipe 136 of the main body 100. The steam flowed into the gas feed pipe 136 flows through the circulation duct 135 to be led into the steam heating device 140 placed in a ceiling part of the heating chamber 120.

The steam heating device 140 incorporates the steam heating heater 141. The steam heating heater 141 comprises a sheathed heater. The steam heated by the steam heating heater 141 is turned into overheated steam. A heat source for generating overheated steam by heating steam is not particularly limited to a sheathed heater.

Assuming that the temperature of saturated steam is 100° C., overheated steam is normally heated up to 101° C. to 300° C. or more. Overheated steam jets out through a plurality of jet holes 165 and 167 arranged in the bottom surface and side surfaces of the steam heating device 140. In this way, overheated steam is fed to the food 300 placed on the rack 122.

The plurality of jet holes 165 are arranged in a middle part of the ceiling of the heating chamber 120, so that overheated steam is blown down to a middle part of the heating chamber 120. In this way, the top surface of the food 300 touches the overheated steam. In addition, part of the overheated steam jets out obliquely downward through the jet hole 167, and is reflected by the inner wall of the heating chamber 120 to be guided below the food 300. In this way, the bottom surface of the food 300 touches the overheated steam.

As overheated steam is fed into the heating chamber 120, excessive gas inside the heating chamber 120 is exhausted to the outside through the exhaust port 132a provided in a lower part of the heating chamber 120. Thus, the inside of the heating chamber 120 is kept at a normal pressure. When heating time suitable for the food 300 passes, steam and overheated steam are stopped being fed, and heat-cooking completes.

By stopping the drive of the steam heating device 140 while feeding steam from the esteamation cup 200, the steam cooker 1 can perform steam-cooking with saturated steam at 100° C.

At the time of feeding water into the esteamation cup 200 or cleaning it, the esteamation cup 200 is detached from the main body 100 by the user, and the lid portion 220 is detached from the cup portion 210. The user feeds water 400 into the cup portion 210, and then attaches the lid portion 220 to the cup portion 210. Then, the esteamation cup 200 is fitted to the main body 100 with the steam feed pipe 221 connected with the gas feed pipe 136 by the joint portion 222.

In the steam cooker 1 designed as described above, the first cooking step is performed in which the supply of electric power to the induction heating coil 171 is larger than that to the steam heating heater 141. Thereafter, the second cooking step is performed in which the supply of electric power to the steam heating heater 141 is larger than that to the induction heating coil 171. The supply of electric power to the induction heating coil 171 and to the steam heating heater 141 is varied according to the duty ratio. Thus, benefits similar to those in the first embodiment can be obtained. As in the second embodiment, a first, a second, and a third cooking steps may be provided.

In addition, the heating member 230 is provided in the esteamation cup 200, and the induction heating coil 171 is provided in the main body 100. This allows the heating member 230 to be heated by the resistance heat of an induction current generated by the drive of the induction heating coil 171. Thus, without the heating member 230 and the induction heating coil 171 being electrically connected together, the heating member 230 can be heated. It is therefore possible to detach the esteamation cup 200, in which water 400 is heated and thus scale is likely to accumulate, from the main body 100 and perform cleaning easily.

Moreover, there is no need to separately provide the water tank 71, the pot 50, or the water feed pump 57 as in the first and the second embodiments, nor piping for connecting these, seals for preventing water leakage, etc. Thus, it is possible to reduce components with which the steam cooker 1 is built and, due to reduction in connection parts, prevent leakage of water or steam.

Moreover, since the heating member 230 faces the induction heating coil 171 when the esteamation cup 200 is fitted to the main body 100, the water 400 in the esteamation cup 200 can be heated efficiently.

Moreover, thanks to the provision of the fixation screw 251, the heating member 230 is provided in the esteamation cup 200 so as to be detachable therefrom. This makes it possible to easily clean the heating member 230 on which scale is likely to accumulate.

INDUSTRIAL APPLICABILITY

The present invention finds application in steam cookers for household or business use that cook an article-to-be-heated by jetting out steam into a heating chamber.

The invention claimed is:
1. A vapor cooker comprising:
a vapor generation heater configured to generate vapor; and
a vapor heating heater configured to heat the vapor generated by the vapor generation heater to generate overheated vapor and configured to heat vapor in a heating chamber through circulation,
wherein the vapor cooker comprises:
a first cooking state in which the article-to-be-heated is cooked with supply of electric power to the vapor generation heater being larger than supply of electric power to the vapor heating heater; and
a second cooking state in which the article-to-be-heated is cooked with supply of electric power to the vapor generation heater being smaller than supply of electric power to the vapor heating heater,
wherein the vapor cooker stores a cooking menu corresponding to the kind of the article-to-be-heated and cooking sequence data corresponding to the cooking menu, and holds data, corresponding to the kind of the article-to-be-heated, of when an internal temperature of the article-to-be-heated exceeds a fat melting temperature zone, but is less than or equal to 100° C. and hence when to switched from the first cooking state to the second cook state, and
wherein the first cooking state is switched to the second cooking state based on the data.

2. The vapor cooker according to claim 1,
wherein an input portion of volume of the article-to-be-heated via which the volume of the article-to-be-heated is inputted is comprised, and
wherein, based on input information of the input portion of the volume of the article-to-be-heated, a time at which the first cooking state is switched to the second cooking state is varied.

3. The vapor cooker according to claim 1,
wherein the first cooking state is switched to the second cooking state when the internal temperature of the article-to-be-heated is 60 to 80° C.

4. The vapor cooker according to claim 1,
wherein the first cooking state is switched to the second cooking state at a time at which rate of temperature variation in the internal temperature of the article-to-be-heated becomes small from a substantially constant state.

5. The vapor cooker according to claim 1,
wherein the vapor heating heater is stopped in the first cooking state.

6. The vapor cooker according to claim 1,
wherein the vapor generation heater is stopped in the second cooking state.

7. The vapor cooker according to claim 1,
wherein the article-to-be-heated is heated by radiation heat from the vapor heating heater.

8. The vapor cooker according to claim 1,
wherein, between the first and the second cooking states, an intermediate cooking state is provided in which
supply of electric power to the vapor generation heater is smaller than in the first cooking state but larger than in the second cooking state, and
supply of electric power to the vapor heating heater is larger than in the first cooking state but smaller than in the second cooking state.

9. The vapor cooker according to claim 1, wherein
supply of electric power to the vapor generation heater and to the vapor heating heater is distributed according to a duty ratio,
a duty ratio of supply of electric power to the vapor generation heater being larger than a duty ratio of supply of electric power to the vapor heating heater in the first cooking state, and
a duty ratio of supply of electric power to the vapor generation heater being smaller than a duty ratio of supply of electric power to the vapor heating heater in the second cooking state.

10. The vapor cooker according to claim 9, wherein
the duty ratio of the supply of electric power to the vapor generation heater is decreased stepwise, and
the duty ratio of the supply of electric power to the vapor heating heater is increased stepwise.

11. A vapor cooker comprising:
a vapor generation heater configured to generate vapor; and
a vapor heating heater configured to heat the vapor generated by the vapor generation heater to generate overheated vapor and configured to heat vapor in a heating chamber through circulation,
wherein the vapor cooker comprises:
a first cooking state in which an article-to-be-heated is cooked with supply of electric power to the vapor generation heater being larger than supply of electric power to the vapor heating heater; and
a second cooking state in which an article-to-be-heated is cooked with supply of electric power to the vapor generation heater being smaller than supply of electric power to the vapor heating heater,
wherein the vapor cooker stores a cooking menu corresponding to the kind of the article-to-be-heated and cooking sequence data corresponding to the cooking menu, and holds data, corresponding to the kind of the article-to-be-heated, of when a rate of temperature variation in an internal temperature of the article-to-be-heated becomes small from a substantially constant state, but is less than or equal to 100° C. and hence when to switched from the first cooking state to the second cook state, and
wherein the first cooking state is switched to the second cooking state based on the data.

12. The vapor cooker according to claim 11,
wherein the vapor heating heater is stopped in the first cooking state.

13. The vapor cooker according to claim 11,
wherein the vapor generation heater is stopped in the second cooking state.

14. The vapor cooker according to claim 11,
wherein the article-to-be-heated is heated by radiation heat from the vapor heating heater.

15. The vapor cooker according to claim 11,
wherein, between the first and the second cooking states, an intermediate cooking state is provided in which
supply of electric power to the vapor generation heater is smaller than in the first cooking state but larger than in the second cooking state, and
supply of electric power to the vapor heating heater is larger than in the first cooking state but smaller than in the second cooking state.

16. The vapor cooker according to claim 11, wherein
supply of electric power to the vapor generation heater and to the vapor heating heater is distributed according to a duty ratio,
a duty ratio of supply of electric power to the vapor generation heater being larger than a duty ratio of supply of electric power to the vapor heating heater in the first cooking state, and
a duty ratio of supply of electric power to the vapor generation heater being smaller than a duty ratio of supply of electric power to the vapor heating heater in the second cooking state.

* * * * *